US008563467B2

(12) United States Patent
Hashisho et al.

(10) Patent No.: US 8,563,467 B2
(45) Date of Patent: Oct. 22, 2013

(54) METHOD FOR PREPARATION OF ACTIVATED CARBON

(75) Inventors: Zaher Hashisho, Edmonton (CA); Chen Heng, Edmonton (CA)

(73) Assignee: The Governors of the University of Alberta, Edmonton (CA)

( * ) Notice: Subject to any disclaimer, the term of this patent is extended or adjusted under 35 U.S.C. 154(b) by 344 days.

(21) Appl. No.: 13/008,421

(22) Filed: Jan. 18, 2011

(65) Prior Publication Data
US 2011/0312485 A1 Dec. 22, 2011

Related U.S. Application Data

(60) Provisional application No. 61/356,429, filed on Jun. 18, 2010.

(51) Int. Cl.
*C01B 31/10* (2006.01)
(52) U.S. Cl.
USPC ............................ 502/432; 502/427; 502/437
(58) Field of Classification Search
USPC .......................................... 502/427, 432, 437
See application file for complete search history.

(56) References Cited

U.S. PATENT DOCUMENTS 5,364,821 A 11/1994 Holland
6,337,302 B1 1/2002 Teng et al.

FOREIGN PATENT DOCUMENTS

CA 2008242 7/1991
CN 101391768 3/2009

OTHER PUBLICATIONS

Shawwa, A.R. et al., (2001), "Color and chlorinated organics removal from pulp mills wastewater using activated petroleum coke", Water Research, 35, pp. 745-749.
Anthony, E.J. et al., (1995) "Fluidized bed combustion of alternative solid fuels; status, successes and problems of the technology", Progress in Energy and Combustion Science, 21, pp. 239-268.
Fedorak, P.M. et al., (2006), "Oil Sands Cokes Affect Microbial Activities", Fuel, 85, pp. 1642-1651.
Krishnan, S.V. et al., (1994), "Sorption of Elemental Mercury by Activated Carbons", Environmental Science & Technology, 28, 1506-1512.
Menendez, J.A. et al., (1999), "Modification of the surface chemistry of active carbons by means of microwave-induced treatments", Carbon, 37, pp. 1115-1121.
Guo, J. et al., (2000), "Preparation of activated carbons from oil-palm-stone chars by microwave-induced carbon dioxide activation", Carbon, 38, 1985-1993.
Nabais, et al., (2004), "Preparation and modification of activated carbon fibres by microwave heating", Carbon, 42, 1315-1320.
Ji, Y. et al., (2007), "Preparation of activated carbons by microwave heating KOH activation", Applied Surface Science, 254, 506-512.
Li, W. et al., (2008), "Preparation of high surface area activated carbons from tobacco stems with K2CO3 activation using microwave radiation", Industrial Crops and Products, 27, pp. 341-347.
Mianowski, A. et al., (2007), "Surface Area of Activated Carbon Determined by the Iodine Absoprtion Number", Energy Sources Part a, 29, pp. 839-850.
Lippens, B.C., et al., (1965), "Studies on Pore Systems in Catalysts", Journal of Catalysts, 4, pp. 319-323.
He, X., et al., (2010), "Effect of activation time on the properties of activated carbons prepared by microwave-assisted activation for electric double layer capacitors", Carbon, 48, pp. 1662-1669.
"About the Resource", Alberta's Oil Sands, retrieved May 22, 2012 from http://oilsands.alberta.ca/resource.html.
Ashar, M., (2008), "Alberta Oil Sands Crudes—Upgrading and Marketing", Journal of Canadian Petroleum Technology, 47, pp. 24-26.
Fernando, R., (2001), the use of Petroleum coke in coal-fired plant, IEA Coal Research, pp. 5-12.
Isaacs, E., (2007), "Petcoke supply & demand", Future Utilization of Petroleum Coke, Calgary.
Freedonia, (2008), Freedonia focus on activated carbon, The Freedonia Group, Inc., pp. 1-25.
ASTM International, (2006), "Standard test method for determination of iodine number of activated carbon", American Society for Testing and Materials, pp. 1-5.
Yang, R.T., (2003), pp. 83 from "Pore structure and standard tests for activated carbon", Adsorbents: fundamentals and applications.
Jack, T.R., et al., (1979), "Comparison of the structure and composition of cokes from the thermal cracking of Athabasca oil sands bitumen", Fuel, 58, 585-588.
Panfilo, R.D., (1995), Abstract of Activated carbon from synthetic petroleum coke, University of Alberta, pp. VII-VIII.

*Primary Examiner* — Stuart Hendrickson
(74) *Attorney, Agent, or Firm* — Anthony R. Lambert

(57) ABSTRACT

A method of preparing activated carbon, is disclosed, comprising: exposing carbonaceous material to microwave radiation in the presence of water to produce activated carbon.

22 Claims, 28 Drawing Sheets

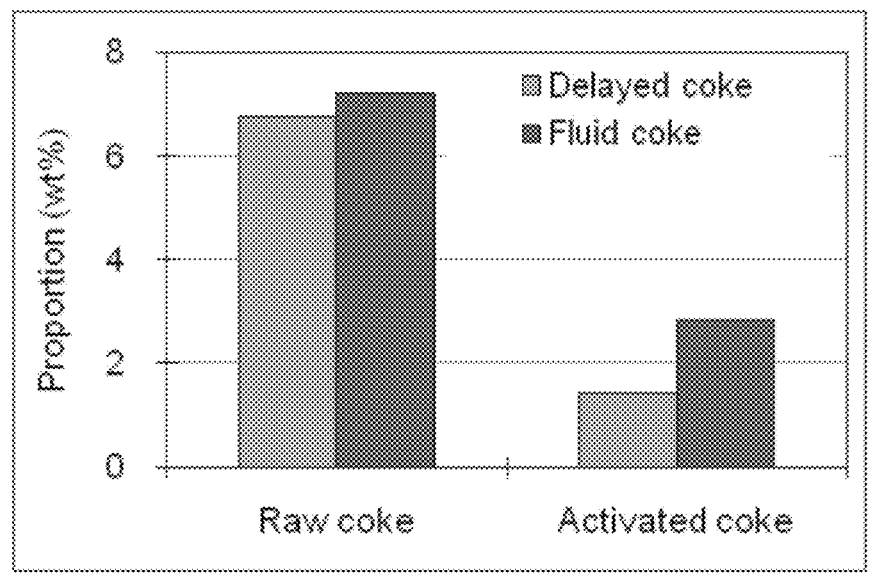
Fig. 24
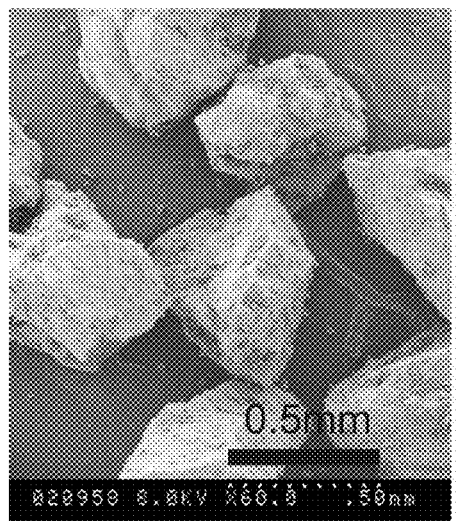 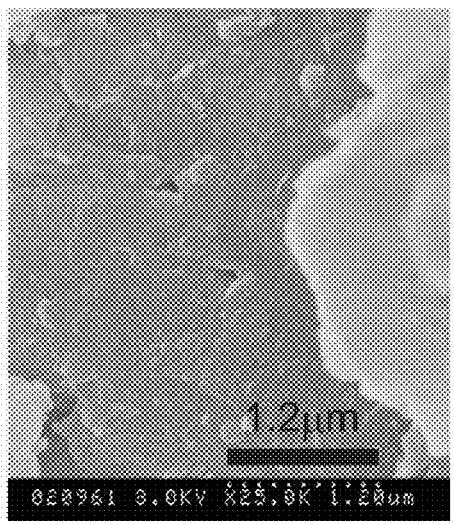
Fig. 25          Fig. 26

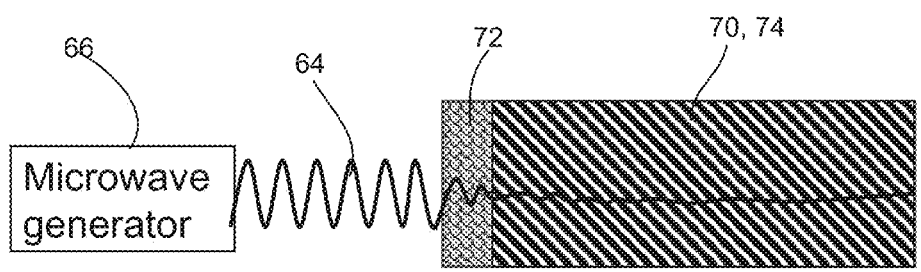
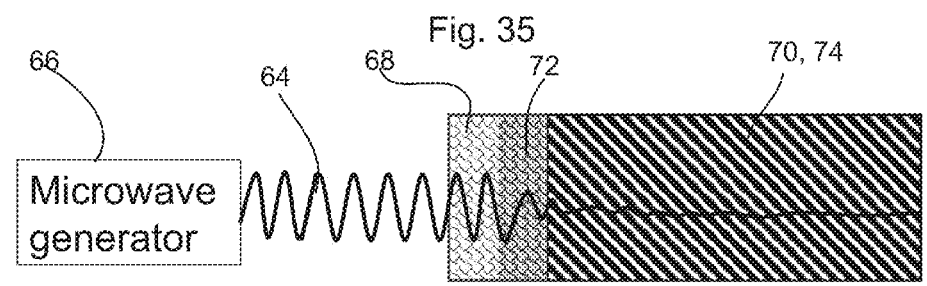
Fig. 35
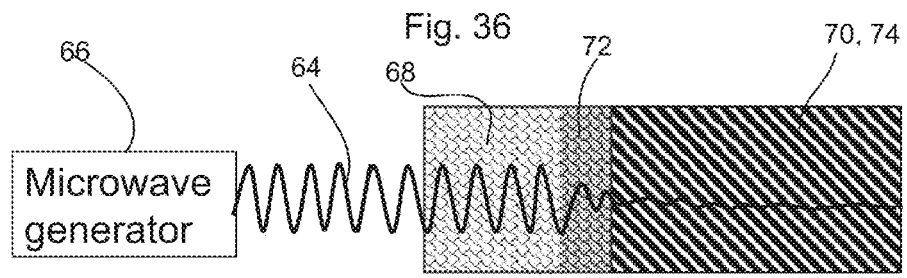
Fig. 36
Fig. 37

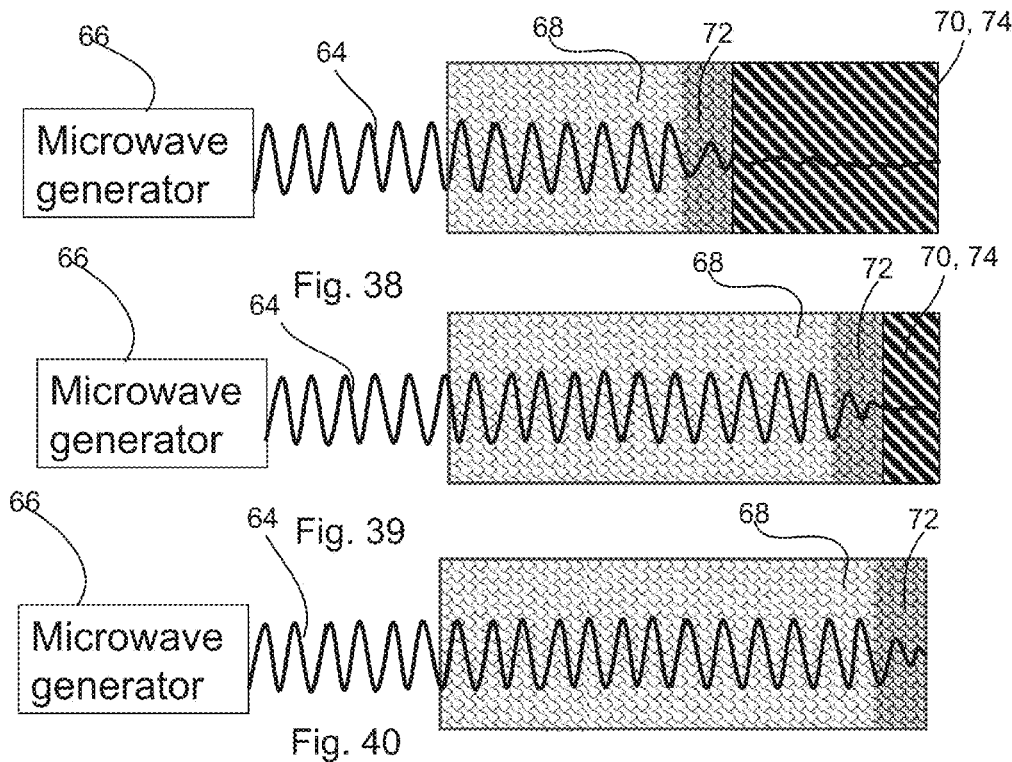
Fig. 38
Fig. 39
Fig. 40
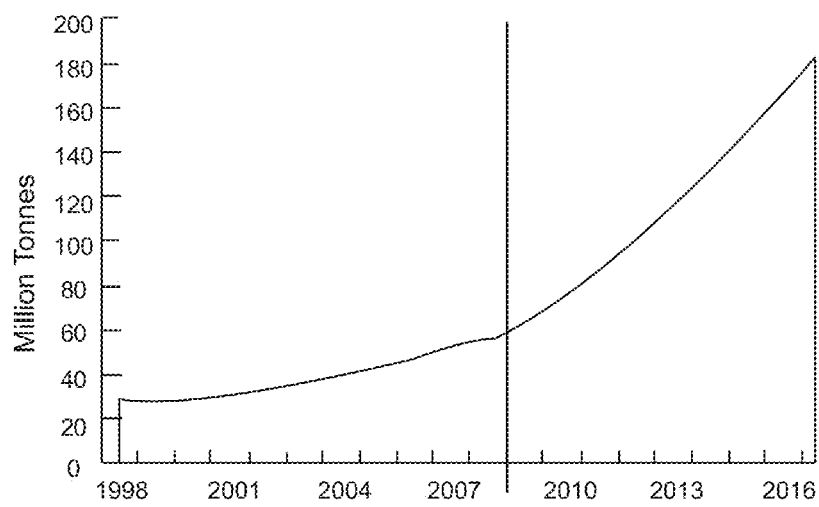
Fig. 41

| Property | water | n-heptane | acetone |
|---|---|---|---|
| Chemical Structure | $H_2OH$ | ∿ | |
| Boiling point (K) | 373 | 372 | 329 |
| Specific heat capacity (kJ/kg * K at 293K) | 4.183 | 2.24 | 2.15 |
| Latent heat of vaporization (kJ/kg) | 2257 | 318 | 518 |
| Thermal conductivity (W/m * K at 298K) | 0.606 | 0.161 | 0.123 |
| Dielectric constant | 76.7[a] | 1.97[a] | 21.4[b] |
| Loss tangent | 0.157[a] | 0.0001[a] | 0.045[c] |
| Dipole moment (D) | 1.84 | 0.0 | 2.9 |

(a: at 25°C, 3 * 10$^9$Hz, b: at 20°C, static, c: at 20°C, 2.45 x 10$^9$ Hz)

METHOD FOR PREPARATION OF ACTIVATED CARBON

CROSS-REFERENCE TO RELATED APPLICATIONS

This application claims the benefit under 35 USC 119(e) of U.S. provisional application Ser. No. 61/356,429 filed Jun. 18, 2010.

TECHNICAL FIELD

This document relates to methods of preparing activated carbon.

BACKGROUND

Adsorption is the adhesion of atoms, ions, biomolecules or molecules of gas, liquid, or dissolved solids to a surface. This process creates a film of the adsorbate (the molecules or atoms being accumulated) on the surface of the adsorbent.

Activated carbon (AC) is a widely used adsorbent for removal of pollutants from gas and water streams, and is conventionally made by pyrolysis and activation of carbonaceous precursor materials. Activation of oil sands coke with steam and/or $CO_2$ may need 1 to 6 hours of heating in a tube furnace and results in an activated carbon with maximal methylene blue adsorption of 100.5 mg/g at 4 hours heating. Microwaves may be used in the activation process.

SUMMARY

A method of preparing activated carbon, is disclosed, comprising: exposing carbonaceous material to microwave radiation in the presence of water to produce activated carbon.

In various embodiments, there may be included any one or more of the following features: Exposing is carried out in the presence of an activation agent. The activation agent is a chemical activating agent. The activation agent is a physical activating agent. The activation agent is any one or more of KOH, $K_2CO_3$, $KHCO_3$, NaOH, $Na_2CO_3$, $NaHCO_3$, steam, air or carbon dioxide. The carbonaceous material is mixed with a chemical activation agent before exposing the carbonaceous material to microwave radiation. The activation agent is destroyed, neutralized, or removed from the activated carbon. The exposing is carried out in the presence of one or more of carbon dioxide or air. The water either comprises water vapor, steam, or water droplets, or is contained in wet carbonaceous matter. The water is water vapor and is carried by a gas carrier. The gas carrier comprises inert gas. The gas carrier comprises nitrogen. The water vapor comprises one or more of steam or water droplets. The water vapor is flowed through the mixture during exposure of the mixture to microwave radiation or the water is preserved in the coke by impregnating in KOH solution without fully drying. The water present during the microwave exposure is added to the carbonaceous material beforehand. The water comprises liquid water. The carbonaceous material comprises one or more of pyrolyzed or carbonized material. The carbonaceous material comprises one or more of coal, petroleum coke, tar, char, or a residual of thermal treatment of the oil or coal industry. The carbonaceous material comprises a byproduct of oil upgrading. The carbonaceous material comprises petroleum coke, delayed coke or fluid coke. The carbonaceous material is pulverized before mixing. The activated carbon is dried to remove water.

A method of regenerating an adsorbent is also disclosed, the method comprising: loading the adsorbent with a adsorbate fluid to give an adsorbate fluid loaded adsorbent; and exposing the adsorbate fluid loaded adsorbent to microwave radiation under a set of exposure conditions, in which the adsorbate fluid is selected such that the adsorbate fluid loaded adsorbent heats at a first maximum rate under the set of exposure conditions, the adsorbent in the absence of the adsorbate fluid heats at a second maximum rate under the set of exposure conditions, and the first rate is higher than the second rate.

In various embodiments, there may be included any one or more of the following features: The adsorbent is microwave transparent. The adsorbent is one or more of ETS10, Ag-ETS10, zeolite, and silica gel. Loading comprises saturating. The adsorbate fluid comprises a polar adsorbate fluid. The polar adsorbate fluid comprises one or more of water and acetone. The adsorbate fluid comprises a non-polar adsorbate fluid.

Referring to what is disclosed in the attachments and the claims below: The carbonaceous material can be any pyrolyzed carbonaceous or carbonized material including coal, petroleum coke, tar, char, any residual of thermal treatment of oil industry and coal industry, or a mixture of them. The method may be used with a chemical or physical activation agent. The chemical activation agent can be KOH, $K_2CO_3$, $KHCO_3$, NaOH, $Na_2CO_3$, or $NaHCO_3$, or mixture of them or materials having similar properties. The physical activation agent can be steam, carbon dioxide, or even air, or mixture of them. Chemical and physical activation agents can be used together. When using steam alone (physical activation), the activation may be heterogeneous since solid-gas reactions can be limited by diffusion of steam. However, when the coke is impregnated with KOH, the reaction of KOH and carbon could be proceeding immediately. The resulting coke structure has pores accessible to the steam, which alleviates the diffusion limitation and makes it easier for steam to contact the carbon. The water may be supplied in other ways, such as by not drying the carbonaceous sample or by mixing with liquid water before microwaving. Coke can be impregnated with KOH solution and then activated in microwaves without drying, for example without fully drying. The coke was dried in the disclosed tests in order to control the moisture content of the coke and perform the tests under well defined experimental conditions. The water may be supplied as steam, water droplets, or wet coke can be used. The concentration of water vapour in the atmosphere in which the reaction occurs may be up to 100% (e.g. pure steam). All microwave frequencies used in industry for industrial heating are satisfactory for this work, including between 800 MHz and 8 GHz, for example 950 MHz and 2.45 GHz. For many embodiments, an activator is required, but it doesn't need to be KOH. It could be any of the chemical or physical activation agents mentioned above or mixture of agents, in any proportion. The activation agent assists in generating nanoscale pores in the carbonaceous material that enable the production of activated carbon. It is expected that use of water alone will suffice to produce activated carbon since the KOH is known to work alone and be more effective with water.

An energy efficient process is disclosed in one embodiment. Carbonaceous products efficiently absorb microwave energy and are effectively heated by microwaves. The fast activation process and the moderate activation temperature result in lower energy consumption during microwave activation. Other techniques for activation of coke may use 2 to 8 hours of heating and result in a lower quality product.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIGS. 21-24 are bar graphs that illustrate the change in proportion of the elements nitrogen, carbon, hydrogen, and sulfur, respectively, after activation.

FIGS. 25-26 are scanning electron microscope (SEM) images of raw delayed coke.

FIGS. 35-40 are a series of side elevation views that illustrate the process of microwave selective heating of an adsorbent initially loaded with adsorbate.

FIG. 41 illustrates the actual and projected increase in petroleum coke inventory from 1998-2016.

DETAILED DESCRIPTION

Figure 1:
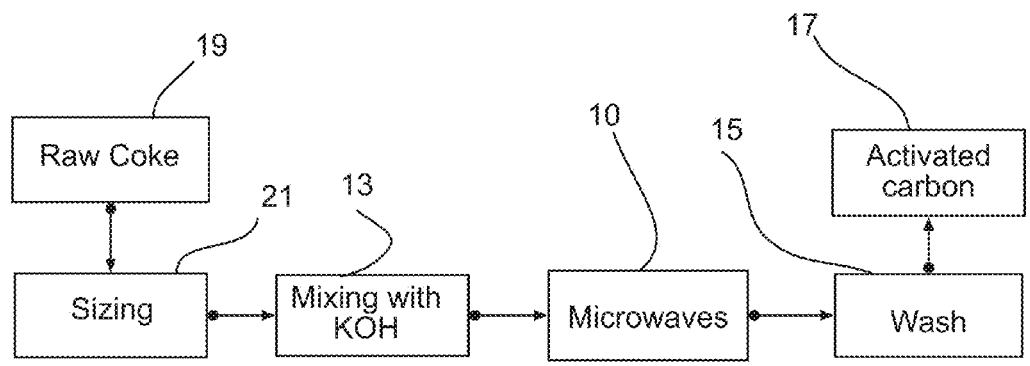
FIG. 1 is a flow diagram of a method of preparing activated carbon from raw coke.

Immaterial modifications may be made to the embodiments described here without departing from what is covered by the claims.

The province of Alberta has the second largest proven reserves of oil in the world; the vast majority of which are found in oil sands deposits. Alberta's oil sands have 173 billion barrels of proven recoverable reserves. Oil sands are naturally occurring mixtures of sand or clay, water and a thick, heavy substance called bitumen. During the upgrading of bitumen, large amounts of petroleum coke are produced. Petroleum coke is a byproduct produced during delayed or fluid coking. Although fluid and delayed cokes have different physical and chemical properties, both have a high calorific value and high sulphur content (about 7 wt %). In Alberta, about 8 millions metric tons of petroleum coke were produced in 2007 and 54 millions tons were stockpiled as waste cumulatively. Referring to FIG. 41, production of petroleum coke will be doubled by 2015 in comparison with 2007, which means a method to effectively dispose or utilize petroleum coke is needed. At the same time, the global demand of activated carbon is increasing at an annual rate of 5%. Therefore, the high carbon content and extremely low cost of petroleum coke make coke as a promising precursor for activated carbon. In addition, the sulfur in the coke can be beneficial for certain applications, such as adsorption of mercury from flue gas. The technology can be applied to treat petroleum coke or other oil industry upgrading products. Currently the price of petroleum coke is low, for example the price of coke from Suncor as used in the study disclosed herein is about $100 per ton. However, the sale price of activated carbon is high. The price of activated carbon ranges from $0.6 to $1 per pound, which equals $1320 to $2200 per ton. The main applications of activated carbon are air pollutant control, water/wastewater treatment, control of Volatile Organic Carbons (VOC), Hg capture, and color/odor removal for example.

In North America, anthropogenic VOCs pose a serious environmental issue, with emissions in 2006: Canada: 1.9M tonnes, Alberta: 0.42M tonnes, and in the USA: 15.3M tonnes (2002). In addition the oil sands, and oil and gas sector contribute 65% of total VOC emission, and 93% of industrial VOC emission. VOCs are important solvents in industry, and thus there is a benefit to recycle and reuse VOCs, with adsorption promoting environmental sustainability by allowing recycle and reuse of solvents. Energy efficient methods for adsorbent regeneration will be useful to achieve this goal.

Activation of petroleum coke has been studied in order to remove organics from pulp mill wastewater. Both carbonization and activation processes were proceeded with by 850° C. in a tube furnace. Steam was used as activation agent and activation time was from 1 to 6 hours. The results showed that maximum methylene blue value of 100.5 mg/g was obtained with 4 hours activation. Activated carbon has also been made by pyrolysis and activation of carbonaceous precursor materials. Oil sands coke, a byproduct of bitumen upgrading, has high carbon content and can potentially be an effective adsorbent after activation. Recently, microwave heating has been applied to prepare activated carbons from different precursors such as wood stem and chars.

This document presents a method of preparing activated carbon, comprising exposing carbonaceous material to microwave radiation in the presence of water to produce activated carbon. Activation may be achieved in short duration, for example 5 to 40 minutes. Parameters such as particle size, humidity of gas stream, KOH/coke ratio, microwave power level, and microwave heating time were studied for their impact on the quality of the activated coke obtained. The specific surface area, iodine number, elemental analysis and scanning electron microscopic images of the as-produced coke and the activated coke were obtained to determine the impact of the activation on the properties of activated carbon obtained. The iodine number of the activated coke obtained after 10 minutes of microwave activation was 1130 mg/g. The short activation time and simplicity of the activation process demonstrate that the microwave-activation method is a promising approach to convert the million of tones of oil sands coke currently stockpiled as waste, into useful adsorbent with high adsorption capacity.

In this document we describe the preparation of activated carbon from petroleum coke in a short duration. The carbonization process may be omitted since most of the volatile content of the coke has already been evaporated due to the intense heat during coking KOH was applied as chemical activation agent and microwave heating was adopted in this study because of its unique heating characteristics. Parameters such as particle size, humidity of the gas stream, KOH/coke ratio, microwave power level and heating time were studied for their impact on the quality of the activated coke obtained. The iodine number, specific surface area and pore size distribution were obtained to determine the impact of the activation on the properties of activated carbon obtained.

EXPERIMENTAL METHODS

Sample Preparation.

Figure 2:
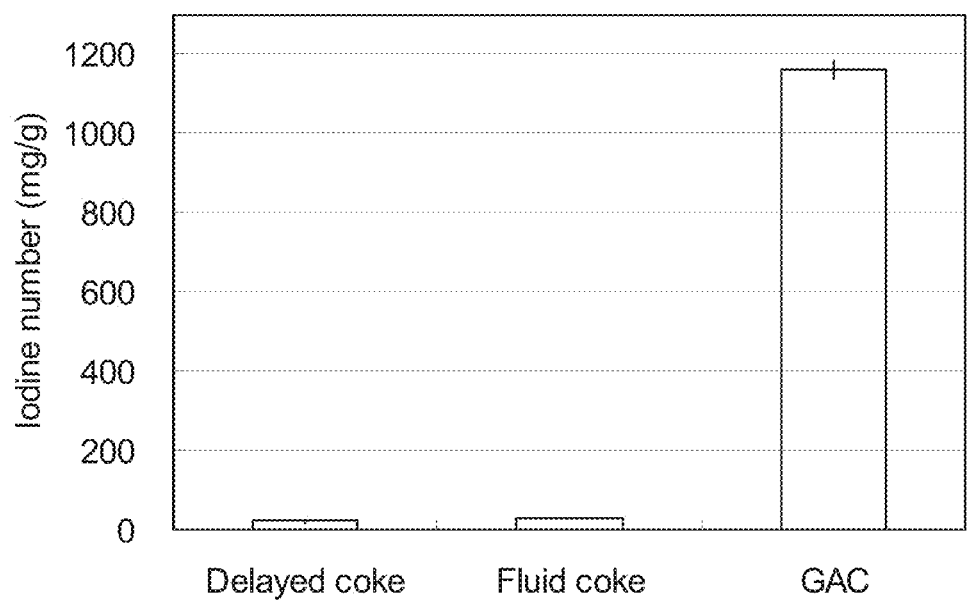
FIG. 2 is a bar graph that illustrates the iodine number of raw coke compared with GAC.
Figure 14:
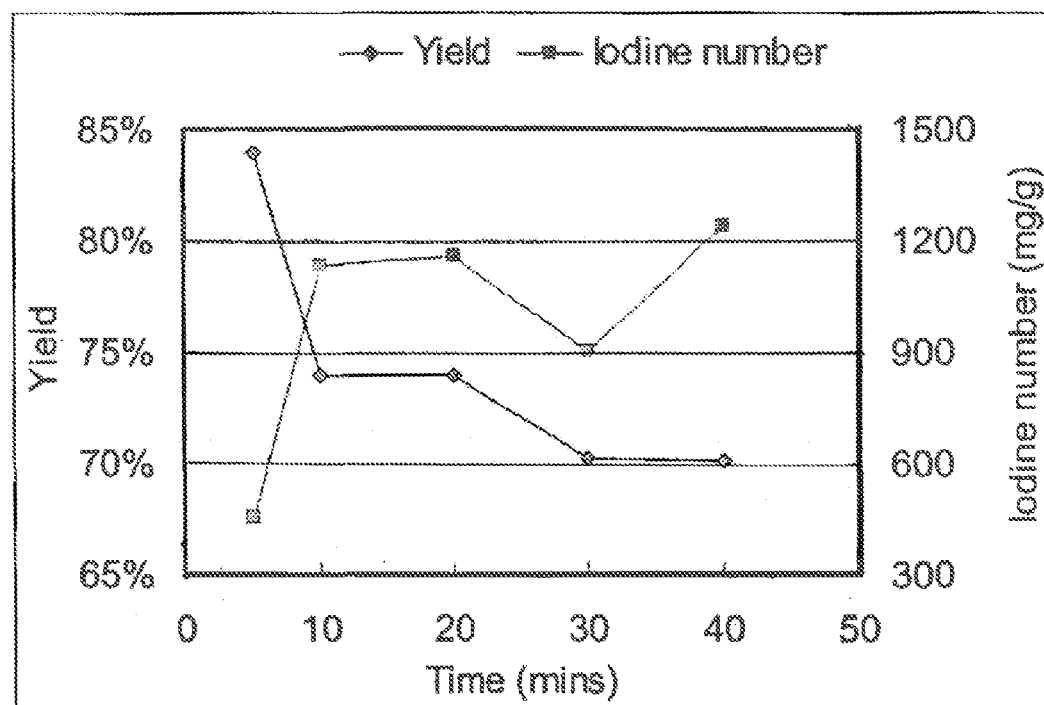
FIG. 14 is a graph that illustrates the yield and iodine number of activated carbon formed in the method of FIG. 1 as a function of microwave heating time.

Referring to FIG. 1, a method of preparing activated carbon is illustrated, comprising in a stage 10 (FIG. 1) exposing carbonaceous material such as petroleum coke to microwave radiation in the presence of water to produce activated carbon. Both delayed coke and fluid coke were tested in this study. Referring to FIG. 2, raw petroleum coke has low iodine numbers and is unsuitable for use as activated carbon. The former was from Suncor Energy and the latter was from Syncrude. Since the size of delayed coke particles covered a wide range (from micrometers to decimeters), and most of fluid coke particles were very fine (around hundreds of micrometers), a series of sieves were used to divide coke particles into select sizes. Referring to FIG. 1, raw coke 19 may be sized in stage 21 before carrying out the stage 10. The size range of the raw coke varies depending on the upgrading technology. In the study carried out three different particle sizes were selected for activation; size I (2-4.76 mm), size II (0.6-0.85 mm), and size III (0.30-0.42 mm). Other suitable sizes may be used. The method may comprise pulverizing or grinding the carbonaceous material before mixing with the activating agent. Referring to FIG. 14, a summary of the results of several activation experiments is illustrated, with iodine number and yield being used to characterize the effectiveness of the activation process. The iodine number of the microwave activated coke is comparable to values reported for commercial activated carbon reported in the literature.

Figure 3:
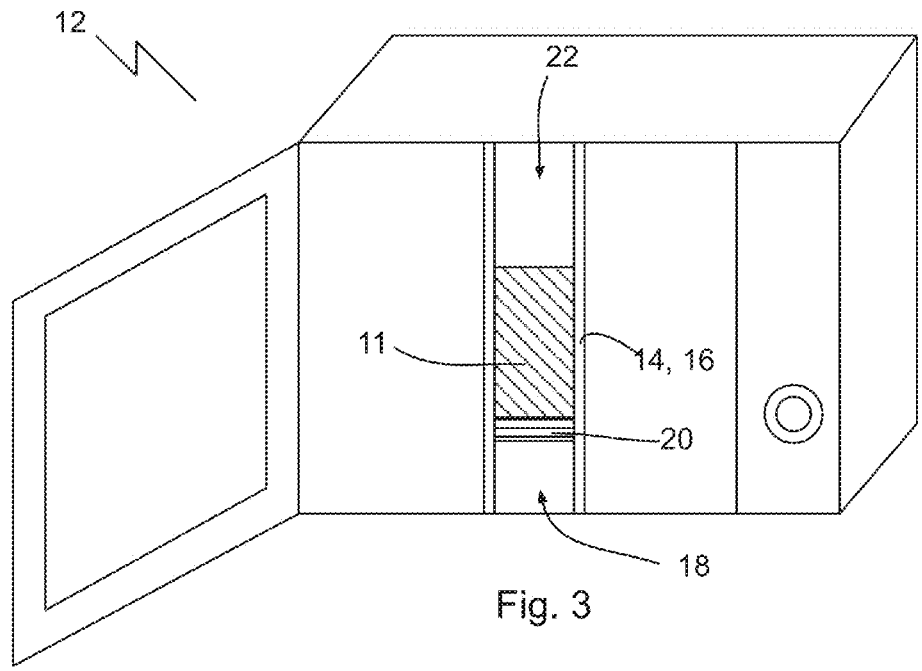
FIG. 3 is a perspective view of the experimental setup for a microwave activation.

Before activation, samples may be dried, for example put in an electric oven at 110° C. for one day to remove humidity. The exposing in stage 10 may be carried out in the presence of an activation agent, such as a chemical activating agent added in stage 13. An example chemical activating agent is KOH, which in the study was dissolved in water and mixed with coke at different ratios. Notably, a control run (not shown) of microwave activation of fluid and delayed coke with no KOH or other activating agent showed no apparent increase in iodine number. Other chemical activating agents may be used, such as a chemical activation agent that comprises one or more of KOH, $K_2CO_3$, $KHCO_3$, NaOH, $Na_2CO_3$, and $NaHCO_3$. The carbonaceous material may be mixed with the chemical activation agent before exposing the carbonaceous material to microwave radiation in stage 10. The mixture may be dried in the oven, for example at 110° C. for 1 day. Referring to FIG. 3, in some embodiments, the water may be preserved in the carbonaceous material such as coke by impregnating the mixture 11 in KOH solution or any solution of a suitable chemical activating agent without drying at all or without fully drying. Thus, the water present during the microwave exposure may be added to the carbonaceous material beforehand. The water may comprise liquid water. In one embodiment, trace liquid water is provided, and in another embodiment, the carbonaceous material is saturated with water. The mixed sample 11 may be put in microwave oven 12 in a reactor 14 such as a glass holder 16 as illustrated in FIG. 1. The reactor 14 may be microwave transparent to facilitate activation. An inert gas such as nitrogen may be used to keep the atmosphere in the reactor 14 inert. The gas may be supplied through the sample 11 for example from an inlet 18 through a porous supporter 20, through the mixture 11 and into an outlet 22 for emission, such as to a fume hood (not shown). Microwave heating may be carried out at a sufficient wavelength such as in a 2.45 GHz customized kitchen microwave oven with a sufficient power level such as 800 W output. In the study, three power levels were used to control the power output, which are referred to herein as high (800 W), medium (620 W) and low (290 W), although other power levels may be used. In the microwave oven used, at the high power level the magnetron works all the time, while it turns on 17 seconds and off 5 seconds at medium power level, and turns on 8 seconds and off 14 seconds at low power level for each 22 seconds. After activation for a sufficient time period in stage 10, the activated carbon may be dried to remove water, for example by drying at 110° C. Referring to FIG. 1, before drying the coke may be worked up for example by washing in stage 15 with dilute hydrochloric acid and de-ionized water until neutralization to produce activated carbon 17. Thus, the method may comprise one or more of destroying, neutralizing, or removing the activation agent from the activated carbon 17.

Characterization of Activated Carbon.

Figure 15:
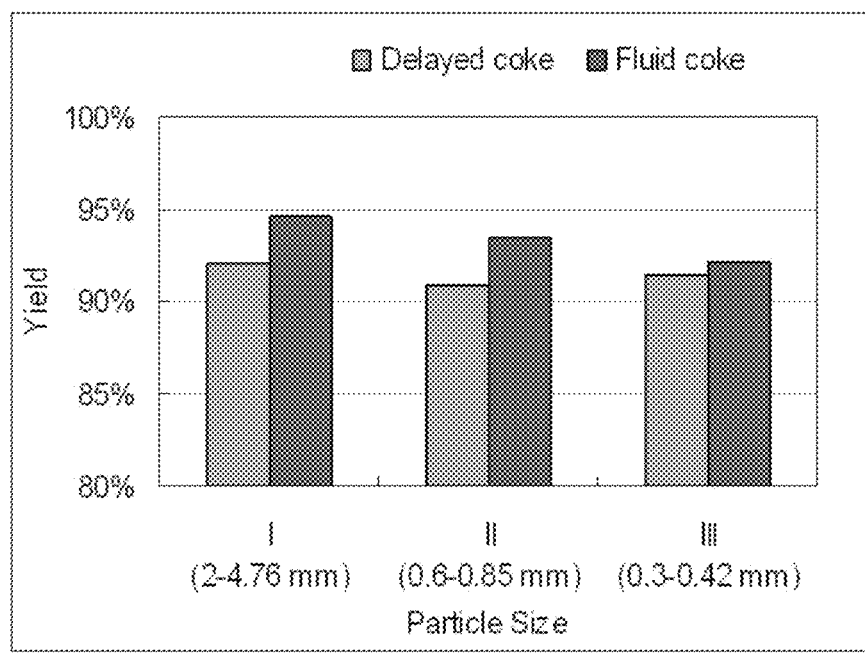
FIG. 15 is a bar graph that illustrates the yield of activated carbon as a function of particle size (KOH/Coke ratio: 0.5, Heating time: 30 mins, Gas: Dry $N_2$, Power level: Low).

Referring to FIG. 15, the activation yield may be defined as the ratio of the mass of final dry activated carbon to the mass of the dry carbonaceous material such as raw coke. After weighing the mass, the activated carbon may be ground and its iodine number measured according to American Standard Test Method D4607.

The nitrogen adsorption isotherm, (which was used to obtain the BET surface area and pore size distribution) may be measured using Autosorb-1 (Quantachrome Instruments) at 77K with nitrogen as the testing gas. The adsorption isotherm covered partial pressures ranging from very low partial pressure ($10^{-5}$ to $10^{-4}$ atm) to near saturation. The adsorption step was followed by a desorption step until the pressure decreased to very low partial pressure ($10^{-5}$ to $10^{-4}$ atm).

Results and Discussion.

Figure 4:
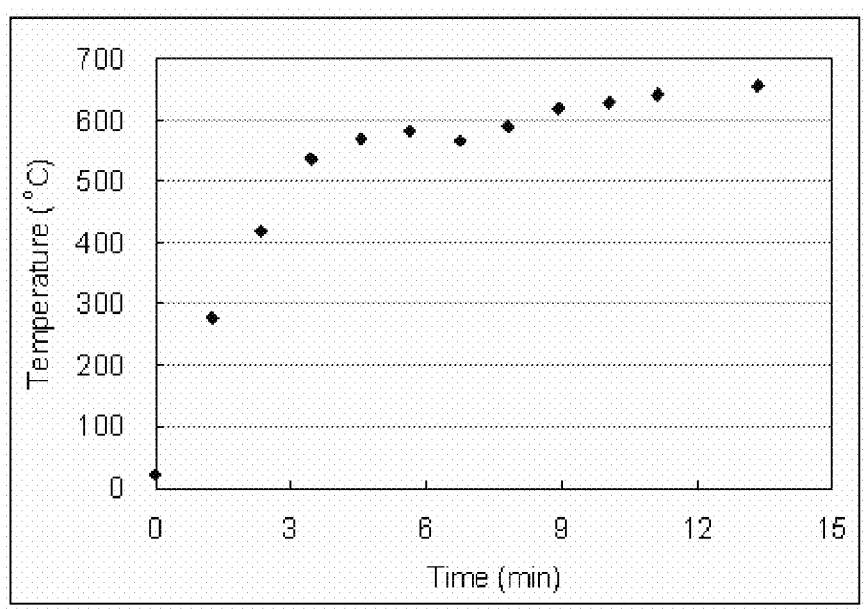
FIG. 4 is a graph that illustrates the temperature of petroleum coke (raw fluid coke) as a function of microwave heating time. Temperature readings were taken immediately after magnetron shutdown in the low power level.

Since coke is a strong microwave absorber, a low power level was selected first in preliminary experiments with petroleum coke (raw fluid coke, size I) without addition of the activating agent to measure the temperature of the coke sample as function of heating time. Referring to FIG. 4, the temperature was measured using a thermocouple immediately after microwave heating as depicted. The temperature of the coke in the study reached about 510° C. after 3.5 minutes of microwave heating and around 650° C. after 13 minutes of microwave heating. The temperature in this procedure may be more than 500° C. in some embodiments. The heating rate was much higher in the beginning and decreased as the temperature reached close to a steady state level. The low level power was chosen for the initial activation experiments.

Figure 5:
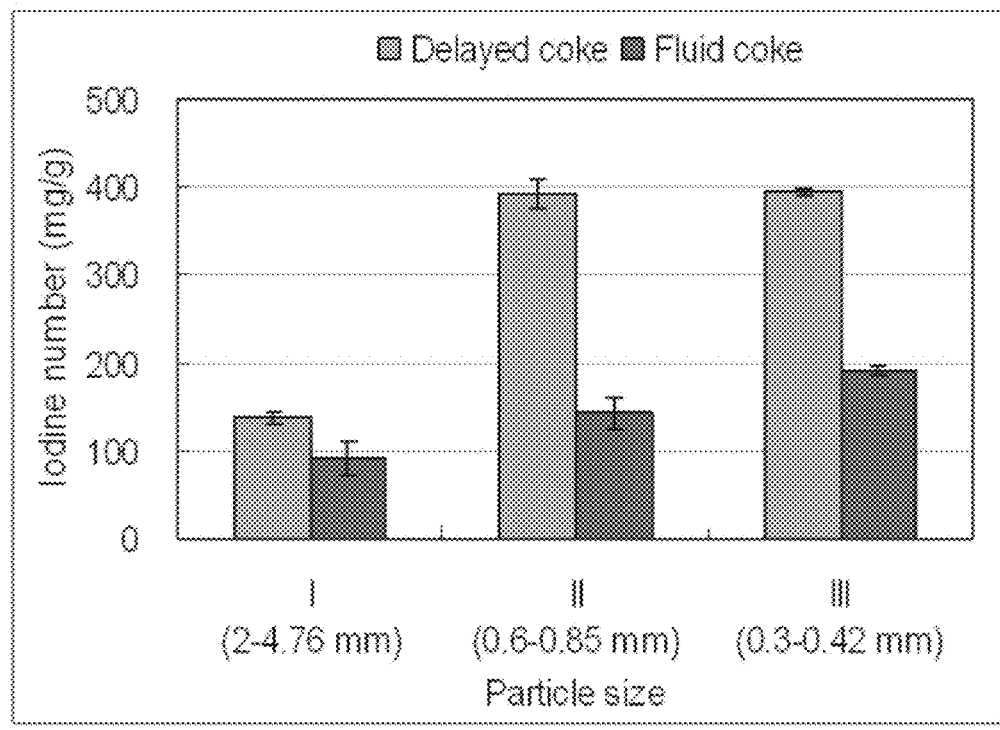
FIG. 5 is a bar graph that illustrates the iodine number of activated coke formed using an embodiment of the method as a function of different particle size (Low power level, microwave heating time is 30 minutes, KOH/Coke ratio is 0.5).

Referring to FIG. 5, iodine number of activated coke for different particle size is illustrated (Low power level, microwave heating time is 30 minutes, KOH/Coke ratio is 0.5). The iodine numbers of delayed and fluid coke in particle size I were much lower than that in particle size II and III. For the delayed coke, iodine numbers of particle size II and III were very close to each other which indicate that the particle size has minimal effect on the degree of coke activation if the particle size is smaller than 0.85 mm. However, for fluid coke, the iodine number increased with decreasing particle size. The larger the coke particle is, the more difficult for the KOH to disperse inside the particle and react with the carbon atoms. Therefore, smaller coke particles have better activation and higher iodine number in general.

Figure 6:
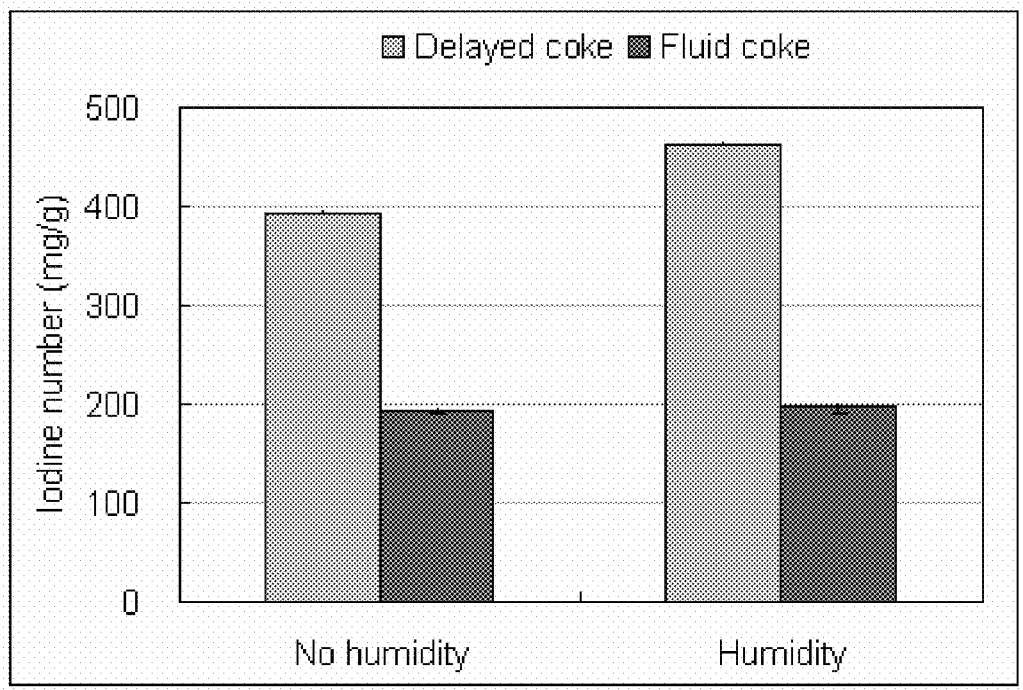
FIG. 6 is a bar graph that illustrates the effect of humidity present during microwave activation of petroleum coke (Low power level, microwave heating time is 30 minutes, KOH/Coke ratio is 0.5, particle size is 0.3-0.42 mm).
Figure 16:
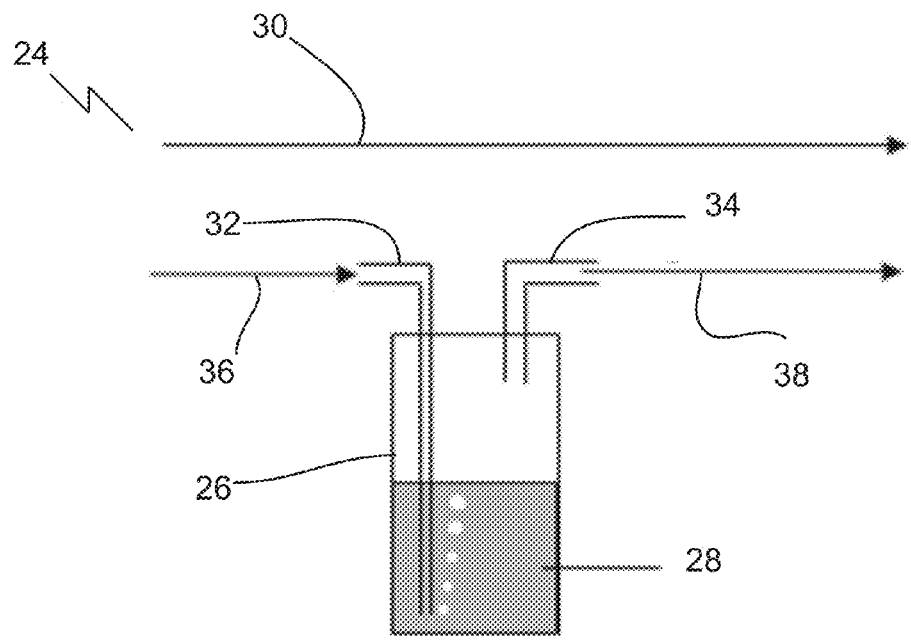
FIG. 16 is side elevation view of an experimental setup for humidifying nitrogen to be used in the microwave activation.

The activation agent may comprise a physical activating agent. For example, steam is a common agent in physical activation of activated carbon precursors, although other suitable physical activating agents may be used such as air or carbon dioxide. In one embodiment, the water present may comprise one or more of water vapor, steam, or water droplets, or is contained in wet carbonaceous matter. Referring to FIG. 16, an apparatus 24 for introducing the water as water vapor carried by a gas carrier such as inert gas is illustrated. Thus, the inert gas such as nitrogen may be humidified by passage through bubbler 26 containing water 28. Humidified gas was tested to determine the effect humidity had on coke activation. Line 30 illustrates the overall path of dry N2, with line 36 illustrating the path of gas supplied to the bubbler 26 from an inlet 32 and line 38 illustrating the path of gas exiting the bubbler 26 through an outlet 34. Referring to FIG. 6, compared with using dry nitrogen, using humidified nitrogen stream increased the iodine number for delayed coke by more than 15%, while it had small impact on the iodine number for fluid coke. Therefore, humidified nitrogen was used in the following experiments to obtain better activation effect. Although water 28 (FIG. 16) was used at room temperature, the water vapor may also comprise one or more of steam or water droplets. The water vapor may be flowed through the mixture 11 (FIG. 3) during exposure of the mixture 11 to microwave radiation. Although nitrogen was used in the study, in some embodiments the exposing stage 10 (FIG. 1) may be carried out in the presence of other gases such as one or more of carbon dioxide or air.

Figure 7:
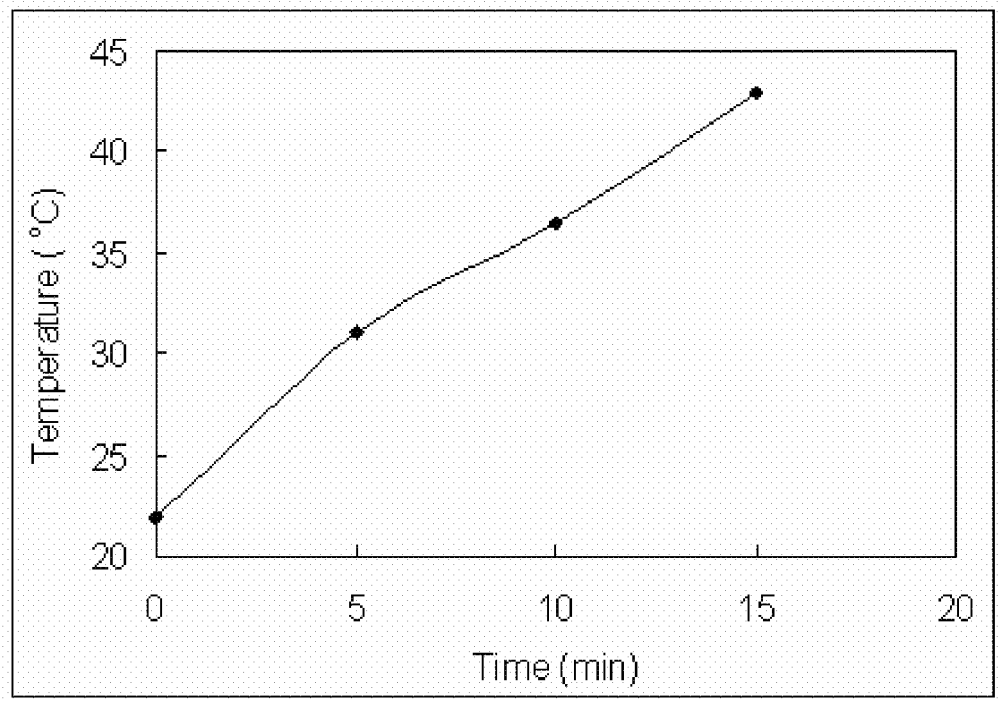
FIG. 7 is a graph that illustrates the temperature profile of pure KOH during microwave heating at low power level.
Figure 8:
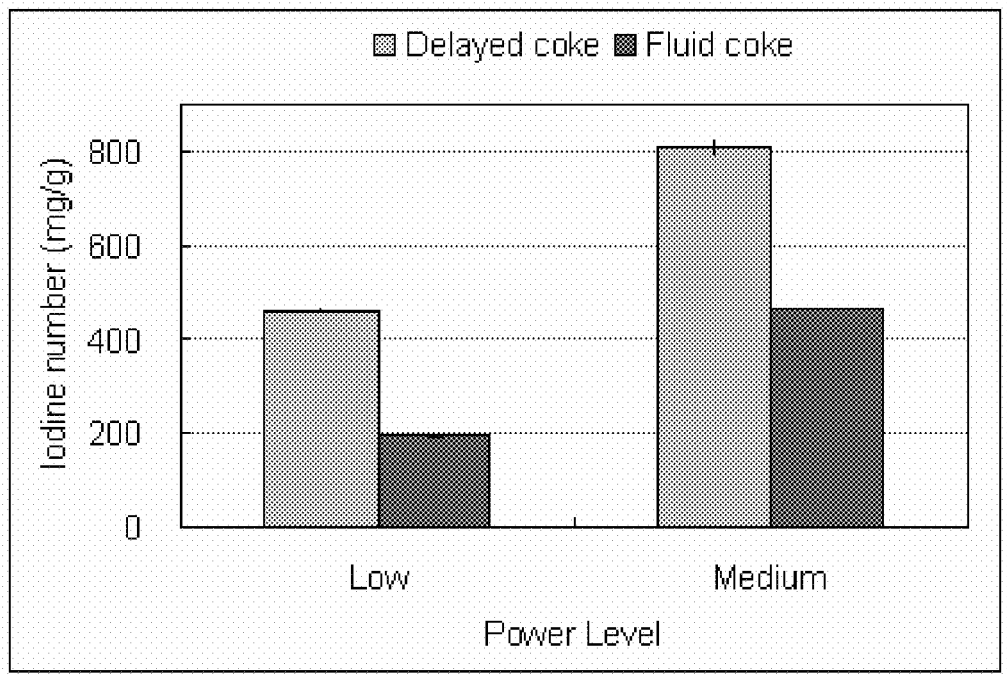
FIG. 8 is a bar graph that illustrates the effect of microwave power level on activation of petroleum coke as measured by iodine number (Particle size is 0.3-0.42 mm, KOH/Coke ratio is 0.5, microwave heating time is 30 minutes, humidified nitrogen).

Referring to FIG. 7, KOH weakly absorbs microwaves as demonstrated by the Figure shown and by the fact that the temperature of the coke-KOH mixture decreases with the increasing proportion of KOH. Referring to FIGS. 4 and 7, the temperature of pure KOH (FIG. 7) increased by about 20° C. after 15 minutes of microwave heating at low power level, whereas the temperature of petroleum coke (FIG. 4) increased by more than 600° C. after 13 minutes of microwave heating. Referring to FIG. 8, when the ratio of KOH/coke equaled one, the low power level was not enough to activate the coke to the desired iodine number. In fact, the temperature of the coke-KOH mixture measured immediately after 30 mins of low power level microwave heating was less than 100° C., and no changes in iodine number or in the appearance of the coke-KOH were observed. Therefore, medium power level was chosen for subsequent experiments. The iodine number of delayed coke and fluid coke increased by 74% and 138% respectively when the microwave power was increased to the medium level and other conditions were kept unchanged.

Figure 9:
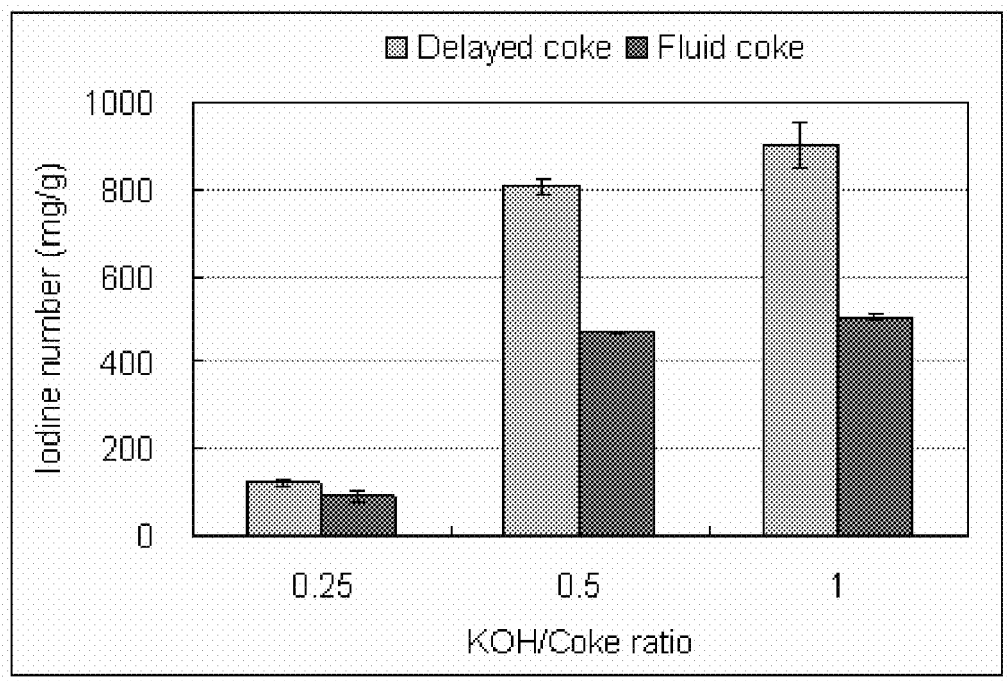
FIG. 9 is a bar graph that illustrates iodine number of activated coke at select KOH/Coke ratios (Particle size is 0.3-0.42 mm, microwave heating time is 30 minutes, nitrogen with humidity, power level is medium).
Figure 17:
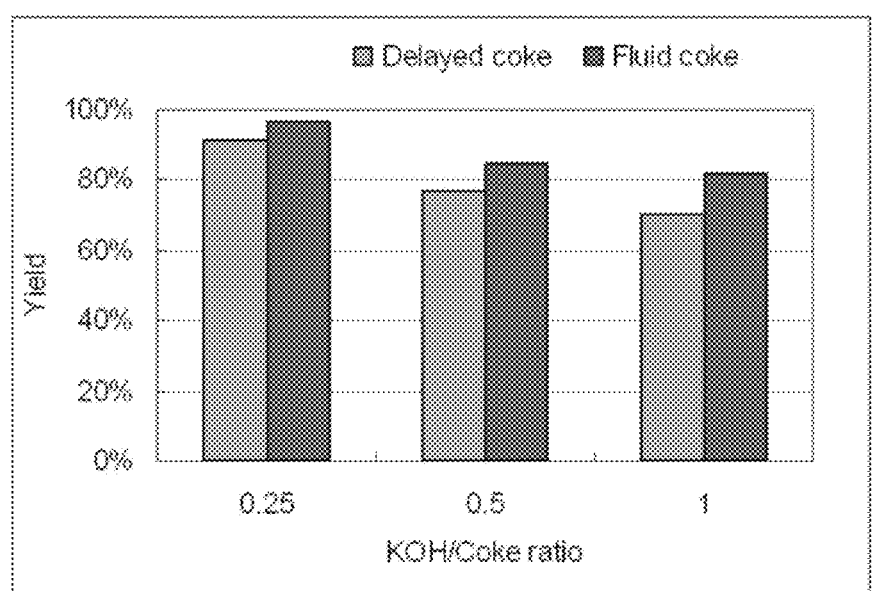
FIG. 17 is a bar graph that illustrates the yield of activated carbon as a function of the KOH/Coke ratio (particle size is 0.30-0.42 mm, 30 minutes microwave heating, nitrogen with humidity, power level is medium).

Referring to FIG. 9, the iodine number of activated carbon increased with the KOH/coke ratio. At KOH/coke ratio of 0.25, the activation is incomplete. The iodine numbers of both delayed coke and fluid coke were around 100 mg/g. When the ratio increased to 0.5, the iodine number reached 807 mg/g for the activated delayed coke, and 466 mg/g for the activated fluid coke. When the KOH/coke ratio reached to 1, the iodine number increased to 950 mg/g for activated delayed coke and to 506 mg/g for activated fluid coke. Referring to FIG. 17, the corresponding yields of activated carbon obtained at the different ratios of KOH/petroleum coke are illustrated.

Figure 10:
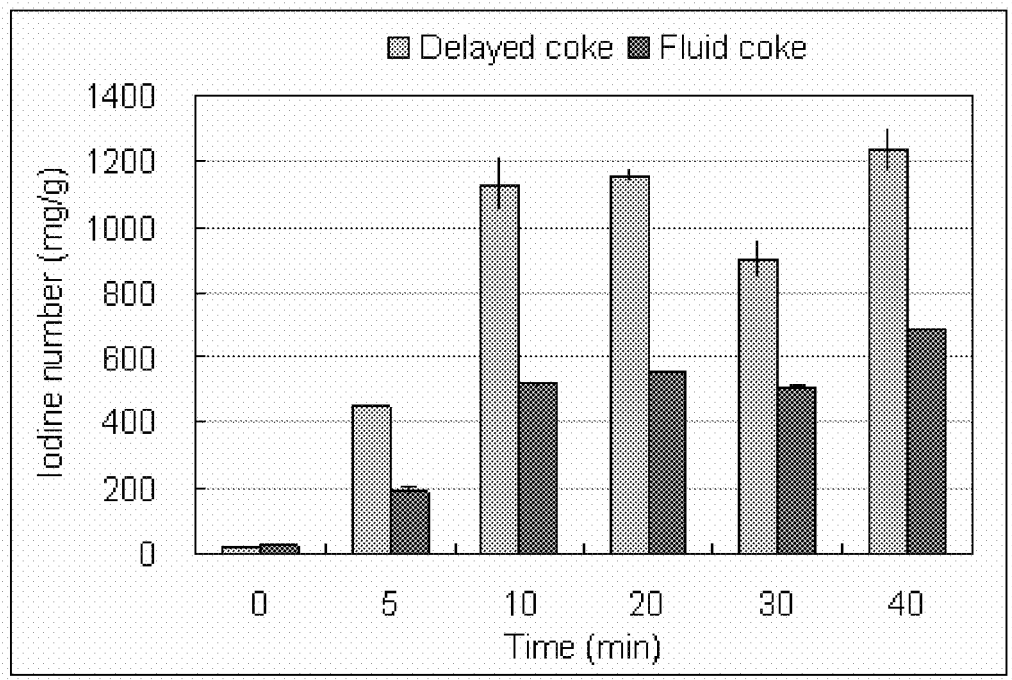
FIG. 10 is a bar graph that illustrates iodine number as a function of microwave heating time (Particle size is 0.3-0.42 mm, KOH/coke ratio is 1, nitrogen with humidity, power level is medium).

Referring to FIG. 10, the microwave heating time is related to the heat applied. The longer the microwave heating time, the more energy is applied onto the coke. FIG. 10 illustrates the iodine number of activated coke after different microwave heating times. The iodine number of raw coke was only 20~30 mg/g. However, even for as short as 10 minutes of microwave heating the iodine number of activated delayed coke increased to more than 1100 mg/g. Yang reported that a typical iodine number for commercial grade activated carbon is 900 mg/g with values >1000 mg/g for better grades of activated carbon. Hence the activated coke obtained has comparable or better adsorption properties to typical activated carbon.

The iodine number however did not vary monotonically with the microwave heating time. For example 20 minutes of microwave heating resulted in small increase in iodine number; however, 30 minutes of microwave heating reduced the iodine number to 901 mg/g. The iodine number for activated fluid coke showed a similar trend with microwave heating time. Such change in the iodine number is related to pore size distribution as we will discuss later.

Figure 11:
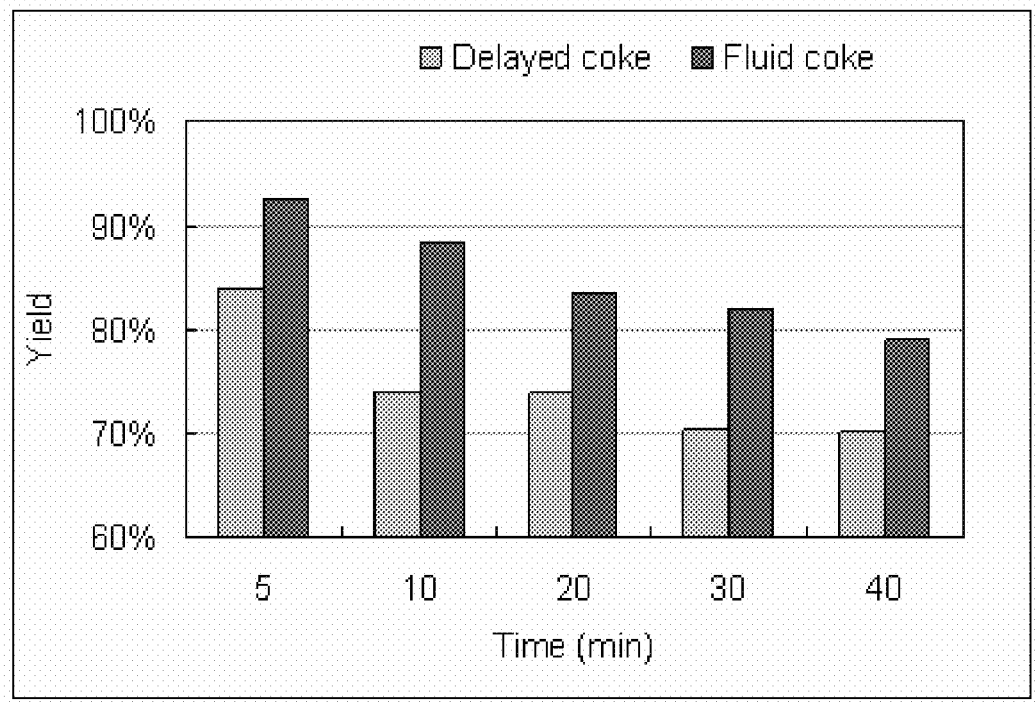
FIG. 11 is a bar graph that illustrates the yield of activated carbon as a function of microwave heating time (activation conditions are the same as in FIG. 10).
Figure 28:
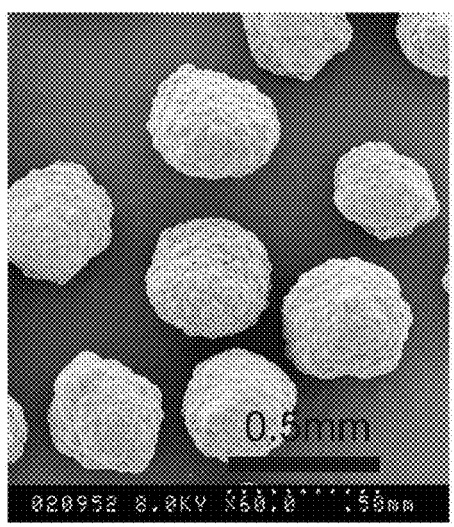
FIGS. 28-29 are SEM images of raw fluid coke.
Figure 29:
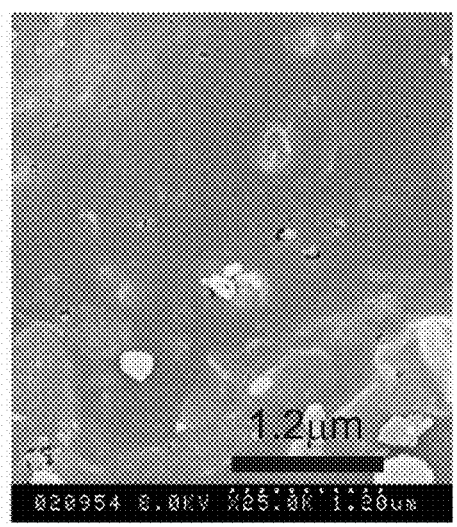

FIG. 11 shows the yield as a function of microwave heating time. The longer the heating time, the more carbon is released and the lower the yield. The iodine number of fluid coke was consistently lower than the iodine number for delayed coke, for the same activation condition, which may be explained based on the unique structure of fluid coke. In the fluid coking process a thin spray of bitumen is sprayed onto a fluidized bed consisting of hot small coke particles. The volatile component of the bitumen is released and the solid part is deposited on the surface of the coke particles. Therefore, referring to FIGS. 28 and 29 each particle of fluid coke has an "onion" like structure and consists about 30-100 layer of deposited coke. It is possible that such a layered structure results in pores that are isolated from each other. Thus it is likely hard for the pores at the surface of the coke particle to be connected to other pores inside the particle. During activation, KOH is mixed and reacted with only the outer layers of the fluid coke. Therefore, the iodine number is lower than that of delayed coke.

Figure 12:
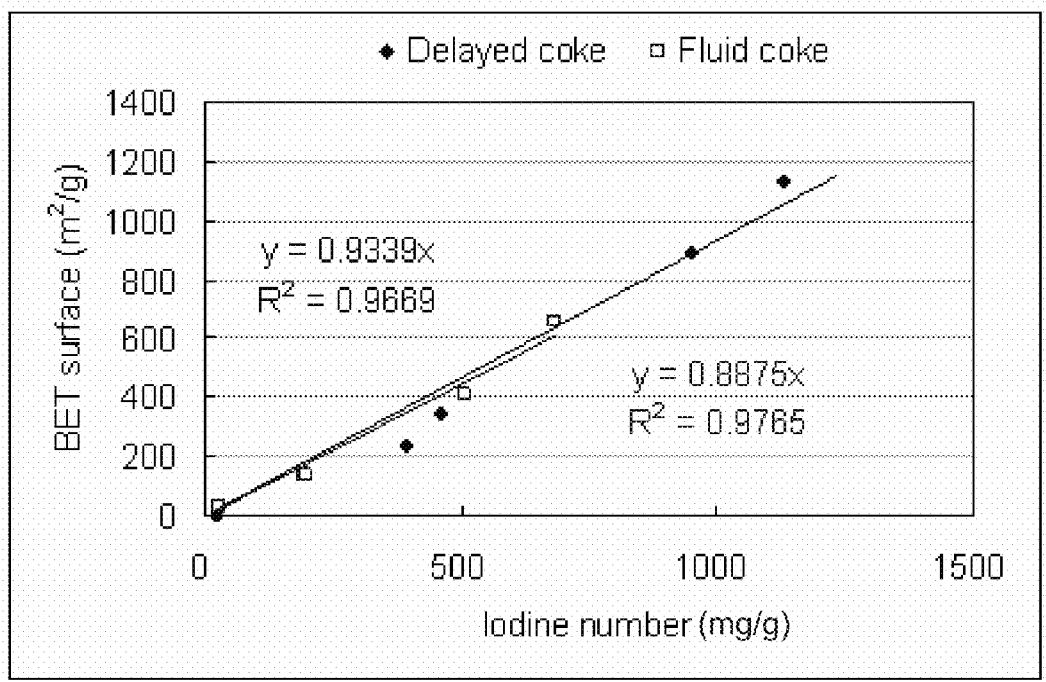
FIG. 12 is a line graph that illustrates the BET surface area as a function of iodine number of the activated carbon.
Figure 13:
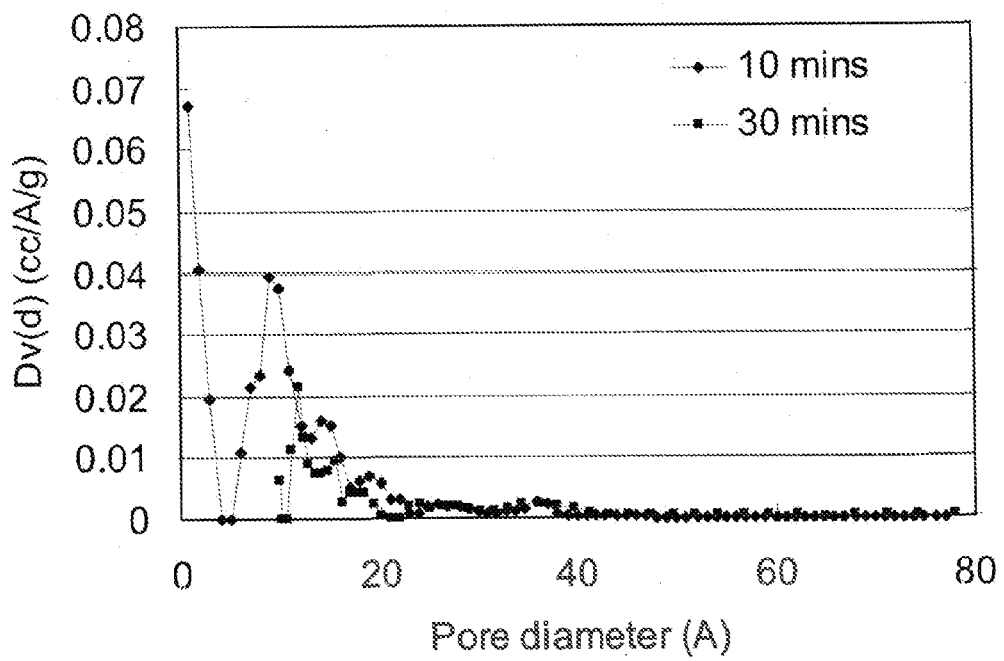
FIG. 13 is a line graph that illustrates the pore size distribution of activated delayed coke of 10 mins and 30 mins microwave heating (Particle size is 0.3-0.42 mm, KOH/coke ratio is 1, nitrogen with humidity, power level is medium).
Figure 18:
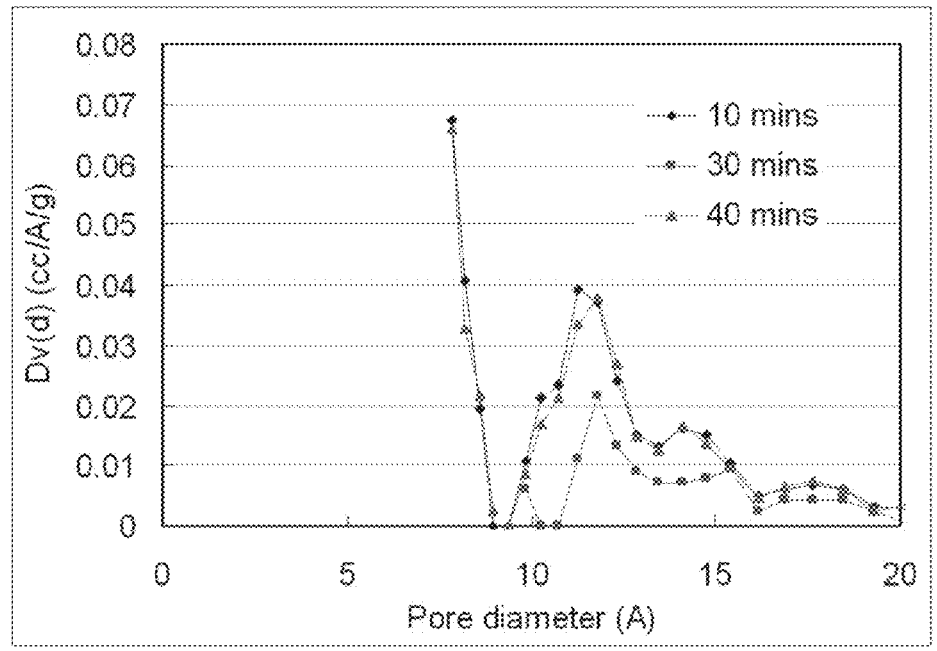
FIG. 18 is a line graph that illustrates the pore size distribution in activated carbon made from delayed coke with different microwave heating times.
Figure 19:
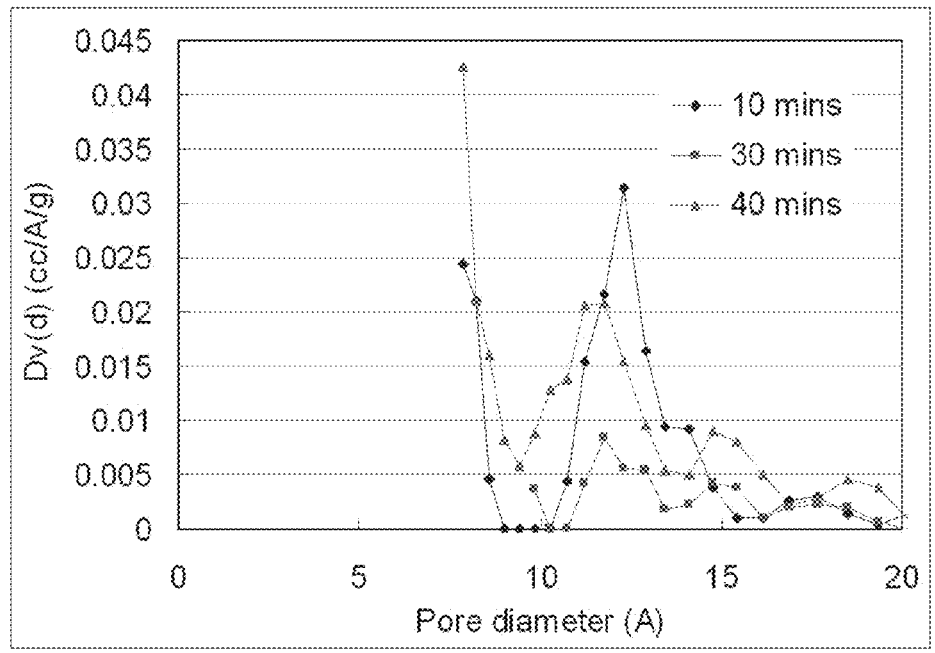
FIG. 19 is a line graph that illustrates the pore size distribution in activated carbon made from fluid coke with different microwave heating times.
Figure 20:
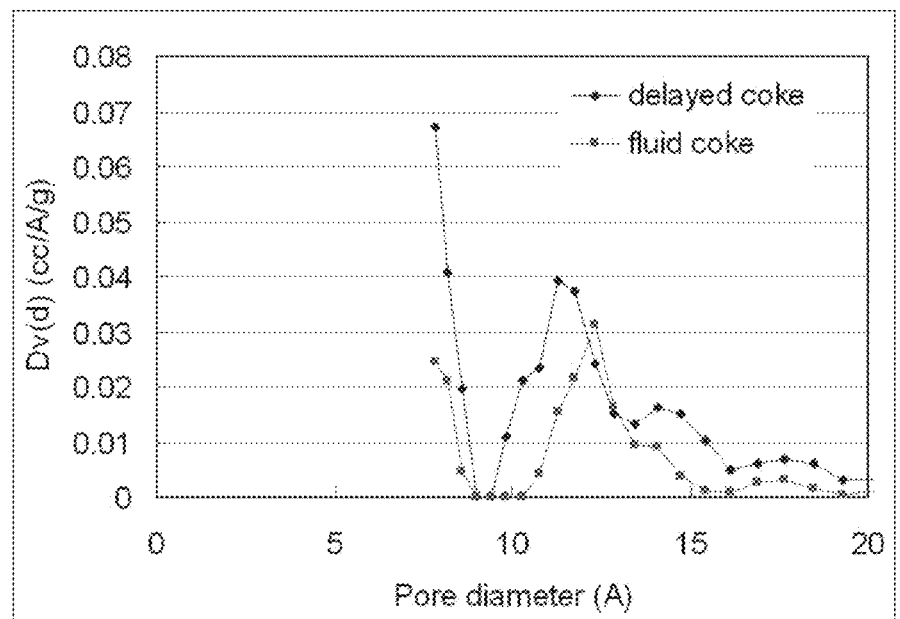
FIG. 20 is a line graph that illustrates the pore size distribution in activated carbon made from delayed coke and fluid coke with 10 minutes of microwave heating times.
Figure 21:
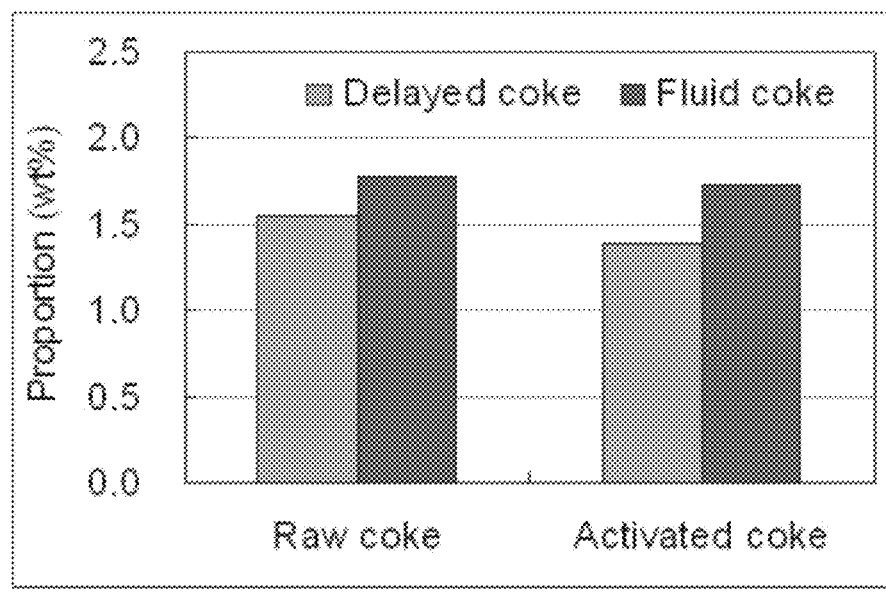
Figure 22:
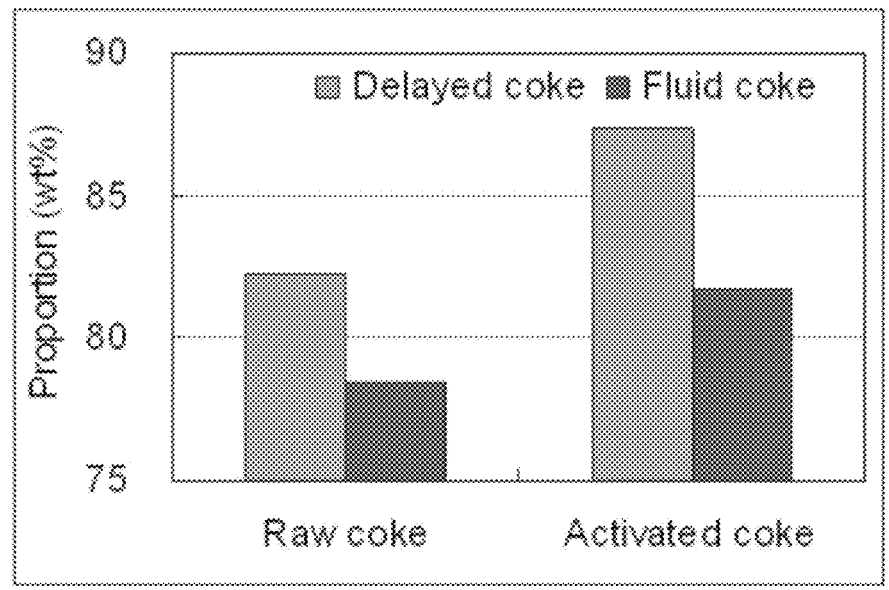
Figure 23:
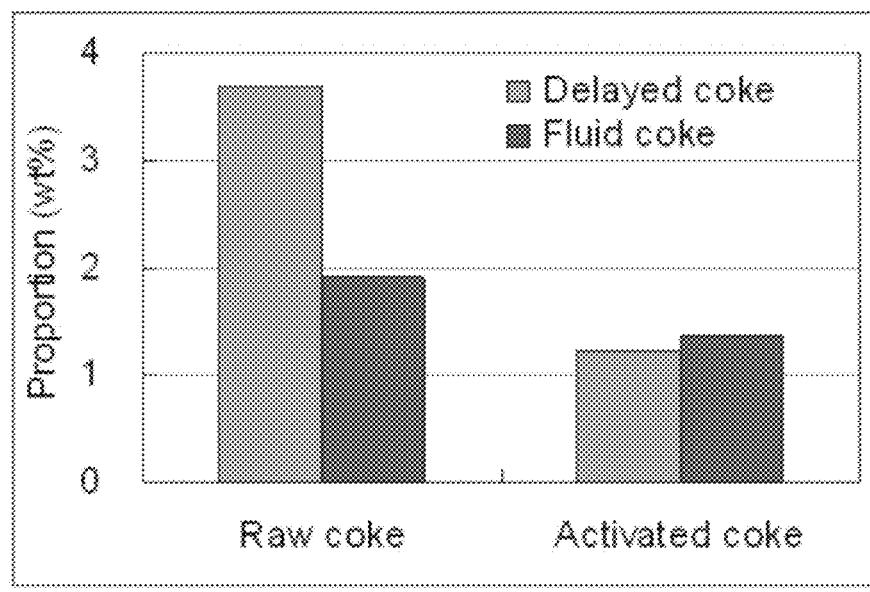
Figure 27:
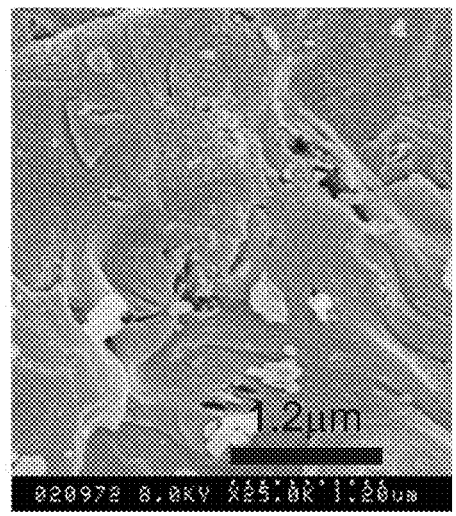
FIG. 27 is an SEM image of activated delayed coke.
Figure 30:
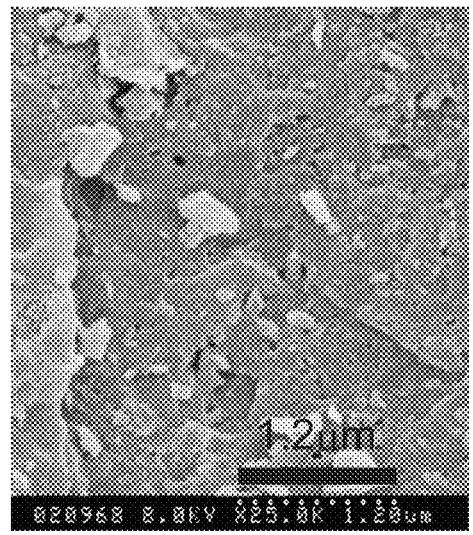
FIG. 30 is an SEM image of activated fluid coke.
Figure 53:
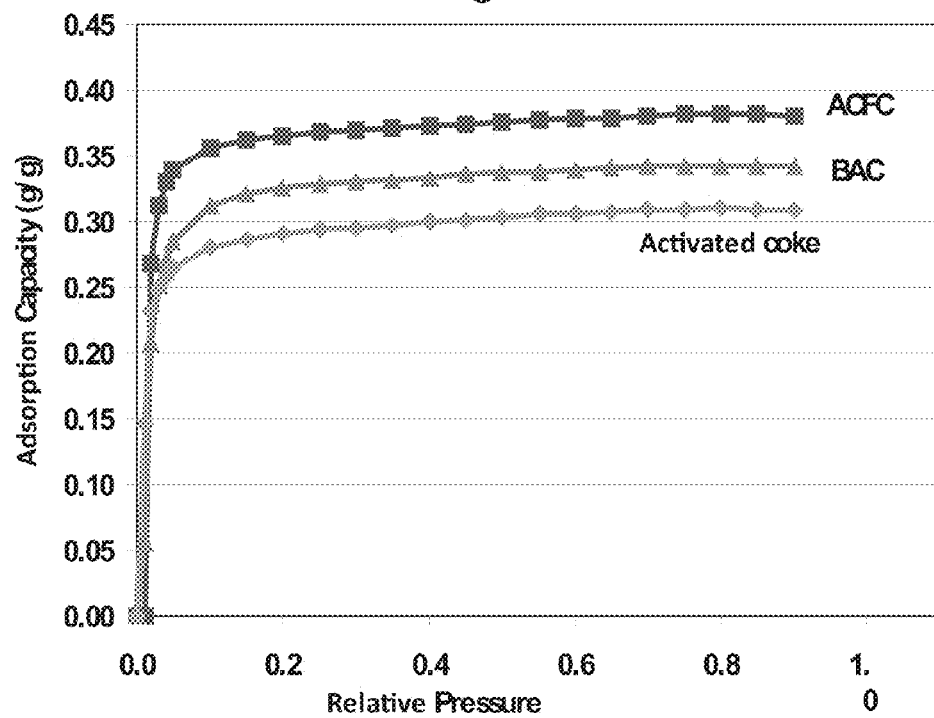
FIG. 53 is a line graph that illustrates the adsorption of acetone on activated carbon fiber cloth (ACFC), biological activated carbon (BAC), and activated coke prepared according the embodiments disclosed herein.
Figure 59:
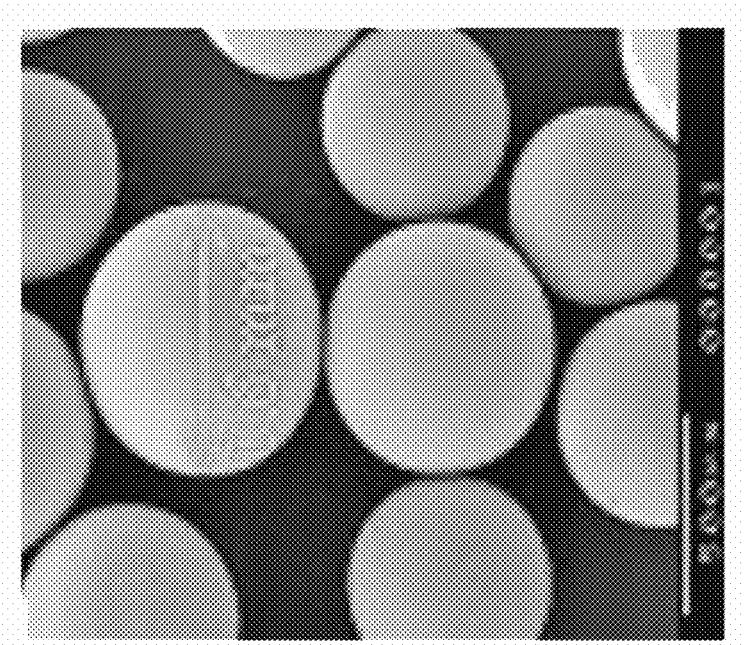
FIGS. 58 and 59 are SEM images of ACFC and BAC, respectively.
Figure 58:
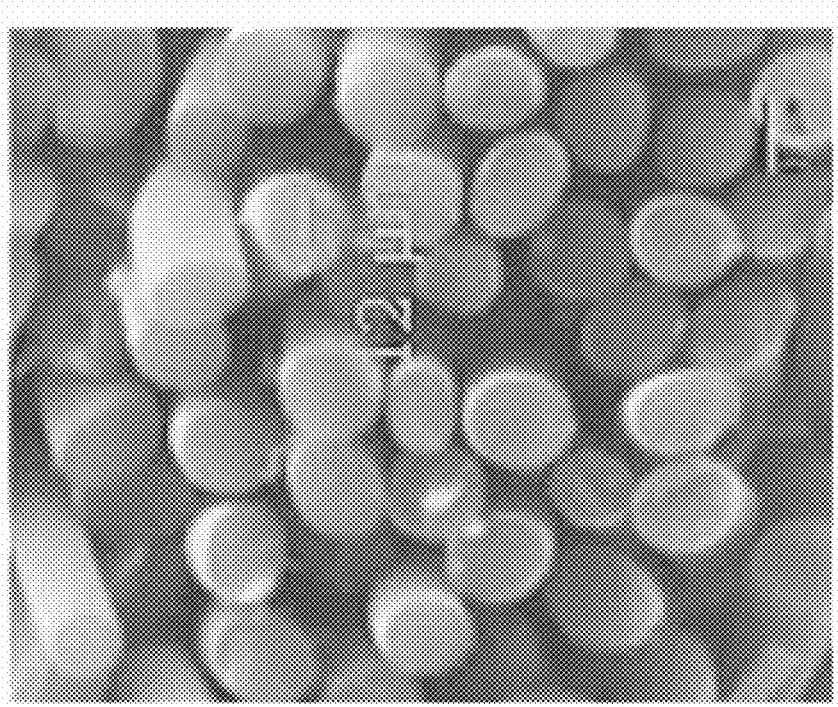

Referring to FIG. 12, the BET surface area as a function of iodine number is illustrated. The BET surface area increased with the iodine number as shown. For both delayed coke and fluid coke, the relationships between surface area and iodine number are linear and the coefficient is close to 1 indicating a strong correlation between BET area and iodine number. Referring to FIG. 13, the pore size distribution of activated delayed coke at 10 mins and 30 mins microwave heating is illustrated (particle size is III, KOH/coke ratio is 1, nitrogen with humidity, power level is medium). FIG. 13 illustrates the pore size distribution of activated delayed coke based on the density functional theory (DFT) model and Table 1 below depicts the impact of activation time on the structural properties of activated coke. More micropores (<2 nm) are found in the 10 minutes heating sample and more mesopores (2 nm<pore size<50 nm) are found in 30 minutes heating sample. FIGS. 18 and 19 illustrate the effect of heating time on the pore size distribution of activated delayed and fluid coke, respectively. Less micropores, and hence lower iodine numbers were found for the 30 mins heating sample compared with the 10 and 40 mins samples. Referring to FIG. 20, more micropores are found in activated delayed coke than activated fluid coke. The longer heating time will enlarge the micropores in the activated carbon, which may cause the pore wall between two small micropores to disappear and merge them into a large micropore. Therefore, the surface area is decreased and the iodine number is reduced as well. Referring to FIGS. 21-24, the carbon content (FIG. 22) of activated coke increases after activation, while the proportions of other elements (N, H, and S—FIGS. 21, 23, and 24, respectively) decrease after activation. Referring to FIGS. 25-27, SEM images show the surface texture of raw delayed coke (FIGS. 25-26) and activated delayed coke (FIG. 27). Similarly, referring to FIGS. 28-30, SEM images show the surface texture of raw fluid coke (FIGS. 28-29) and activated fluid coke (FIG. 30). FIGS. 27 and 30 illustrate that the coke surface is more textured after activation, indicating a higher BET surface area. FIG. 53 illustrates that the adsorption of acetone on activated carbons such as ACFC and BAC and the microwave activated coke produced herein show comparable results. FIGS. 58 and 59 are SEM images of ACFC and BAC, respectively.

TABLE 1

Effect of activation time on the structural properties of activated delayed coke

| | Activation time | |
| --- | --- | --- |
| | 10 min | 30 min |
| Iodine number (mg/g) | 1130 | 950 |
| BET area (m$^2$/g) | 1131 | 891 |
| Total pore volume (cm$^3$/g) | 0.46 | 0.38 |
| Micropore volume (cm$^3$/g)* | 0.42 | 0.33 |
| Micropore volume (%) | 92% | 86% |

*based on t-method analysis

Summary.

Petroleum coke is a suitable precursor for activated carbon based on its high carbonaceous content. Microwaves and KOH were used to prepare activated carbon from petroleum coke. Smaller coke particle sizes and the use of humidified nitrogen stream resulted in activated coke with higher iodine numbers indicating better adsorption properties.

Figure 57:
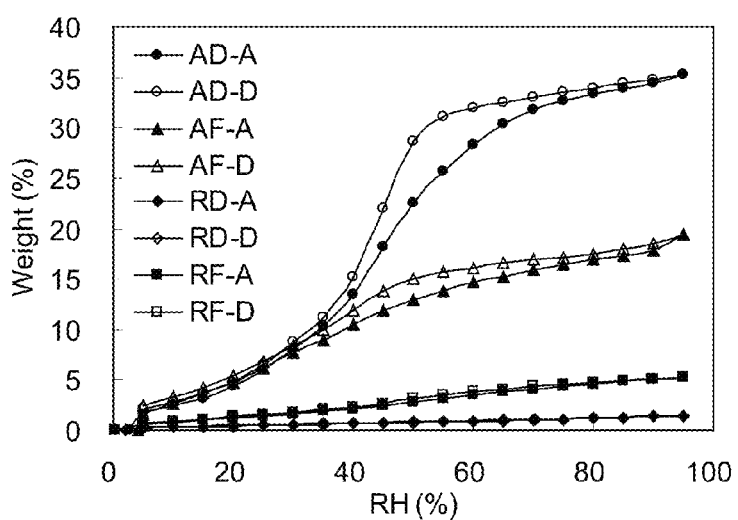
FIG. 57 is a line graph that illustrates adsorption isotherms of water vapor onto raw and activated cokes prepared according the embodiments disclosed herein. AD-D: desorption of activated delayed coke, AD-A: adsorption of activated delayed coke, AF-D: desorption of activated fluid coke, AF-A: adsorption of activated fluid coke, RD-D: desorption of raw delayed coke, RD-A: adsorption of raw delayed coke, RF-D: desorption of raw fluid coke, RF-A: adsorption of raw fluid coke.

Activated coke with better adsorption properties may also be obtained by increasing the microwave power level and the KOH/Coke ratio. In general, activated delayed coke produced higher iodine number than activated fluid coke. After 10 minutes of microwave heating, the iodine number was 1130 mg/g for activated delayed coke and 517 mg/g for activated fluid coke. Pore size distribution of activated delayed coke indicated that most pores are in the micropore range and longer microwave heating time increased the pore size but did not always increase the iodine number of the activated coke. The short activation time and simplicity of the activation process demonstrate that the microwave-activation method is a suitable approach to convert large amounts of petroleum coke into a useful adsorbent with high adsorption capacity. Referring to FIG. 57, the adsorption and desorption of water vapor onto raw and activated cokes is illustrated. Water vapor was used to characterize the adsorption behavior of the cokes. The activated cokes were prepared using microwave activation and KOH, as described herein. The raw coke has very low adsorption capacity compared to the activated cokes. Compared with raw fluid coke, the raw delayed coke has lower capacity for all the range of RH, which is consistent with the results of the iodine number and BET surface area tests. After activation, the adsorption capacity of both cokes significantly increased. Activated delayed coke showed higher adsorption capacity than activated fluid coke. This is consistent with the results of the iodine number and BET surface area tests. The above results confirm that the microwave activation process can transform the oil sands coke into an adsorbent with high adsorption capacity.

Although the petroleum coke such as delayed coke and fluid coke was tested in the study carried out, it should be understood that any suitable type of carbonaceous material may be used in the methods disclosed herein. For example, the carbonaceous material may comprise one or more of pyrolyzed or carbonized material. As well, the carbonaceous material may comprise one or more of coal, petroleum coke, tar, char, or a residual of thermal treatment of the oil or coal industry. The carbonaceous material may also comprise a byproduct of oil upgrading. In addition, although the method may be used to produce activated carbon from material that is not activated carbon, spent activated carbon may be used in some embodiments as the carbonaceous material. Waste tires and plastics may also be the source of carbonaceous material. In some embodiments, water is excluded during activation. For example, no water and a KOH/petroleum coke ratio of 0.1-1.2 may be used.

Figure 54:
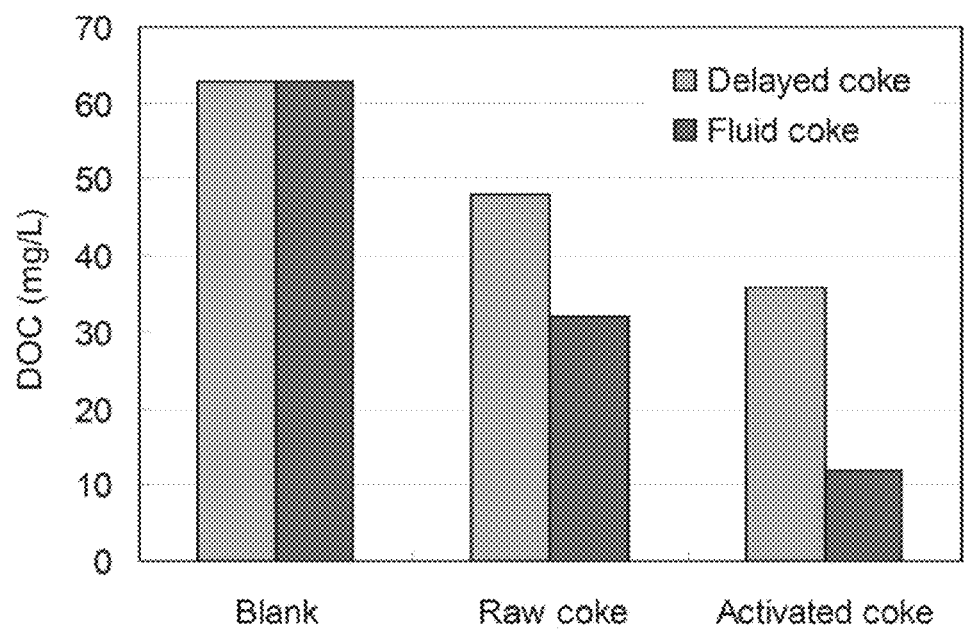
FIG. 54 is a bar graph that illustrates the amount of dissolved organic carbon (DOC) present in raw coke and activated coke prepared according the embodiments disclosed herein. The test was done using tailings water from the Suncor south tailings pond, and analyzed with the HACH-DR/2400 method, with a coke dose of 5 wt. %.
Figure 55:
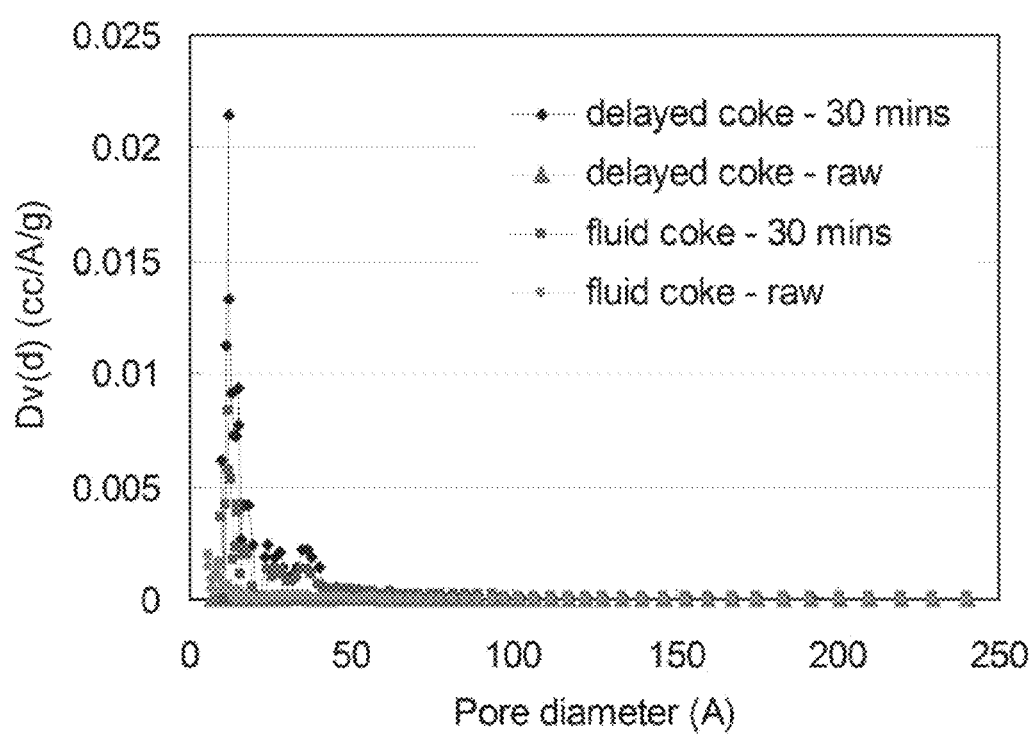
FIG. 55 is a line graph that illustrates the pore size distribution of raw coke and activated coke prepared according the embodiments disclosed herein.

Tailings water may be treated by the activated carbon produced according to the methods disclosed herein. Currently there is more than 130 km$^2$ of tailings ponds in the oil sands region. These ponds are toxic and should not be allowed release of contaminants such as napthenic acids into the environment. Tailings ponds comprise a fluid mixture of water, wand, silt clay, unrecovered hydrocarbons and dissolved chemicals. FIG. 54 illustrates the amount of DOC present in raw coke and activated coke prepared according the embodiments disclosed herein. The test was done using tailings water from the Suncor south tailings pond, and analyzed with the HACH-DR/2400 method, with a coke dose of 5 wt. %. Referring to FIG. 55, the fluid coke, whether raw or activated, has better adsorption capacity for DOC in tailings water than delayed coke, possibly because it has more mesopores (2-50 nm) than delayed coke, although its total pore volume is lower. Microwave heating can be used to activate oil sands coke in a very short duration. This method can generate activated coke with high adsorption capacity and high yield (>900 mg/g iodine number & >70% yield for delayed coke and >500 mg/g & >80% for fluid coke). Fluid coke can remove more DOC in tailings water than delayed coke. In addition, a 5 wt. % dose of activated fluid coke can remove more than 80% of DOC. This shows that activated coke is a promising adsorbent for removing contaminants from tailings water.

Figure 31:
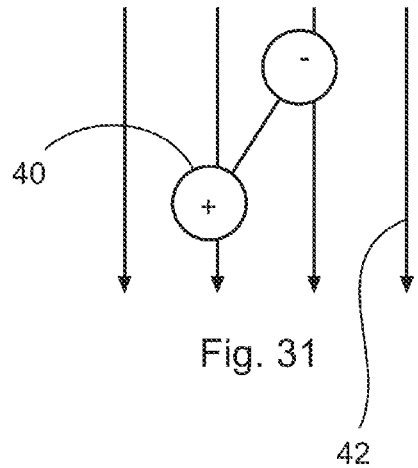
FIG. 31 is diagram of a polar molecule in an alternating electric field.
Figure 32A:
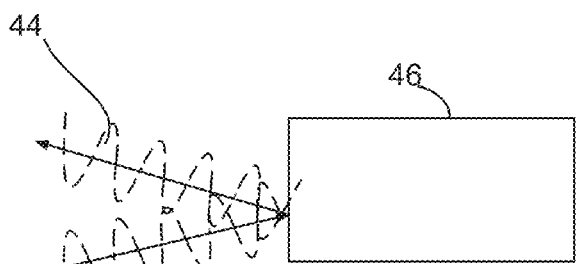
FIGS. 32A-C are side elevation views that illustrate the behavior during microwave heating of reflective material, microwave transparent material, and microwave absorbent material, respectively.
Figure 32B:
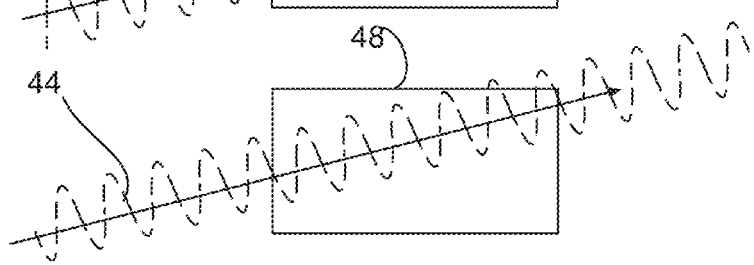
Figure 32C:
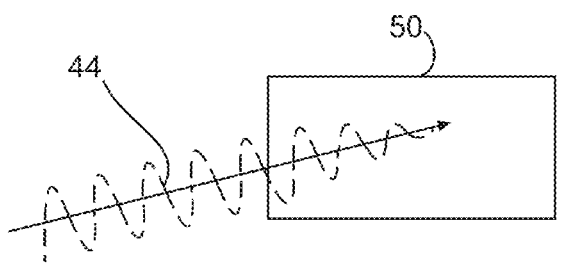
Figure 33:
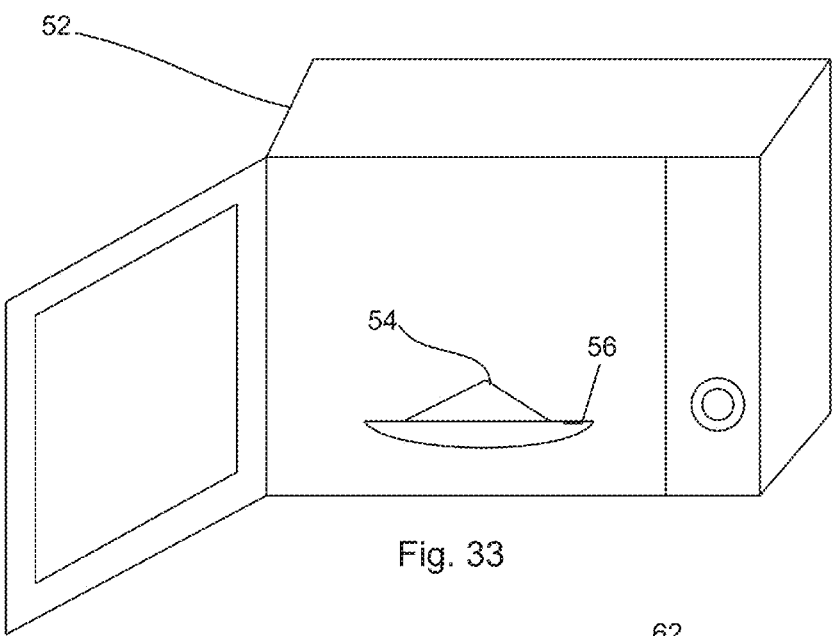
FIG. 33 is a perspective view of an experimental setup for microwave selective heating.
Figure 34:
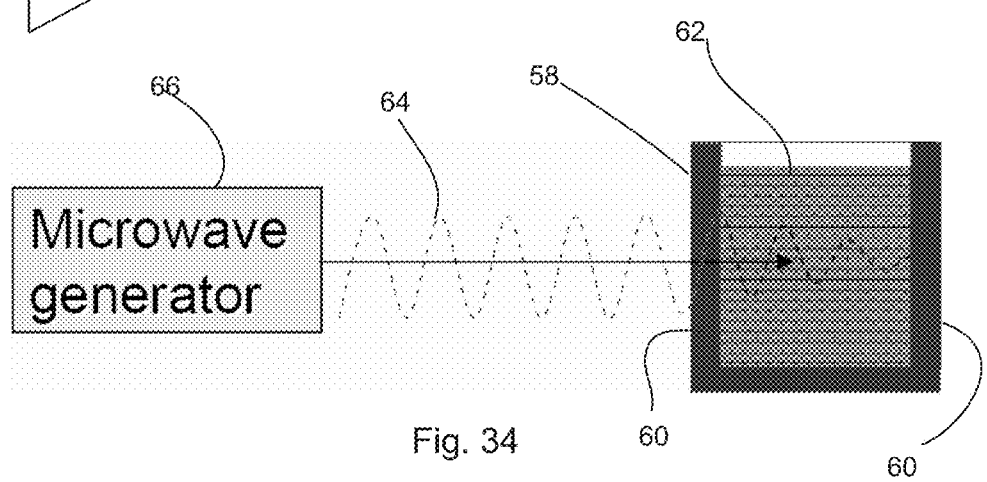
FIG. 34 is a side elevation view that illustrates the selective absorption of microwaves within an experimental setup designed to allow maximum microwave exposure to a microwave absorbent material.

Referring to FIG. 31, the behavior of a polar molecule 40 in an alternating electric field 42 caused by microwave heating is illustrated. Because the polar molecule 40 in this case absorbs microwaves, it will oscillate and absorb heat energy in doing so. This behavior gives microwave heating the advantages of selective heating, high energy efficiency, ability to heat from inside to outside, high heating rate, and short heating time. Not all materials respond to microwaves the same way. For example, FIGS. 32A-C illustrate the path of a microwave 44 as it encounters a microwave reflecting material 46 such as a bulk material, a microwave transparent material 48 such as glass, and a microwave absorbing material 50 such as water. Referring to FIG. 33, by loading a microwave absorbing material 54 on a microwave transparent plate 56, microwaves produced in a microwave oven 52 may effectively target the material 54. Referring to FIG. 34, another example is given where a microwave transparent material 58 with walls 60 may be used to hold a column 62 of microwave absorbing material to increase the surface area of the column 62 to microwaves 64 produced by a microwave generator 66.

Figure 56:
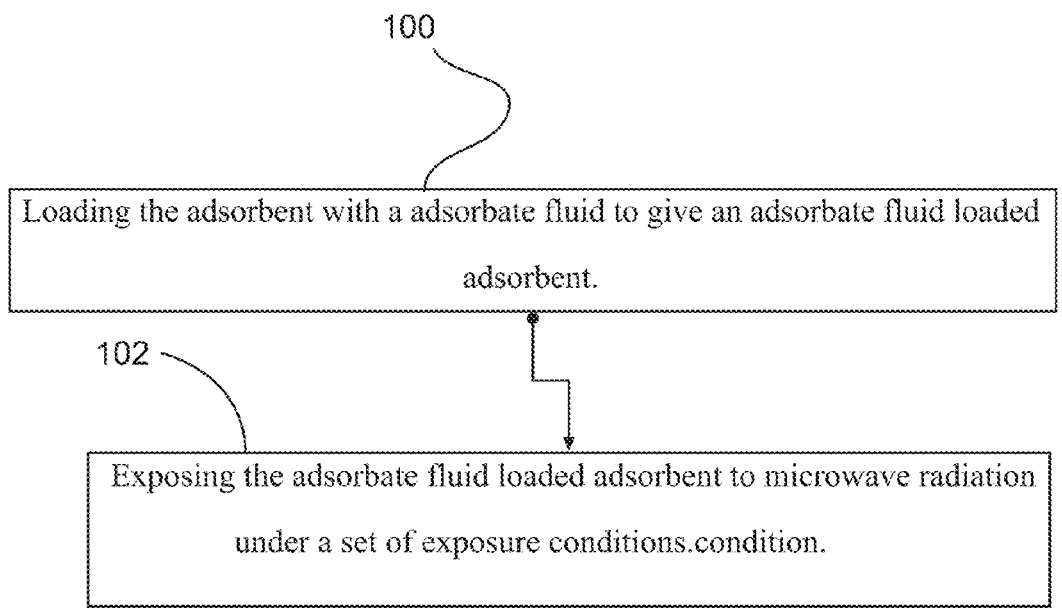
FIG. 56 is a flow diagram of a method of regenerating an adsorbent is illustrated.

Referring to FIG. 56, a method of regenerating an adsorbent is illustrated. The method steps of FIG. 56 will now be described with reference to other Figures. Referring to FIGS. 35-40, an example of microwave selective heating is illustrated. Effectively, this can occur when a fluid adsorbent 68 that has little or no microwave absorption when pure is loaded with a fluid adsorbate 70 that absorbs relatively more microwaves 64 or is highly microwave absorbent. Thus, as the microwave heating progresses, a mass transfer zone 72 travels along the material, defined at the interface between pure adsorbent 68 and adsorbate 70. Because of the relatively high absorption of microwaves 64 of the adsorbate 70, this mass transfer zone 72 is a zone where microwave absorption is concentrated, leading to a hot spot formed at the zone 72. This hot spot allows more effective vaporization of the fluid adsorbate 70 at the zone 72, and more effectively heats the adsorbent 68 at the zone 72.

In stage 100 (FIG. 56) adsorbent 68, which may be microwave transparent, is loaded with an adsorbate fluid 70 to give an adsorbate fluid loaded adsorbent 74. In stage 102 (FIG. 56), the adsorbate fluid loaded adsorbent 74 is exposed to microwave radiation 64 under a set of exposure conditions. The adsorbate fluid 70 is selected such that the adsorbate fluid loaded adsorbent 72 heats at a first maximum rate under the set of exposure conditions, the adsorbent 68 in the absence of the adsorbate fluid 70 heats at a second maximum rate under the set of exposure conditions, and the first rate is higher than the second rate. The set of exposure conditions may include conditions such as power level, microwave frequency, pressure, sample size, and other suitable variables. Thus, microwave selective heating is accomplished.

Figures 42, 43:
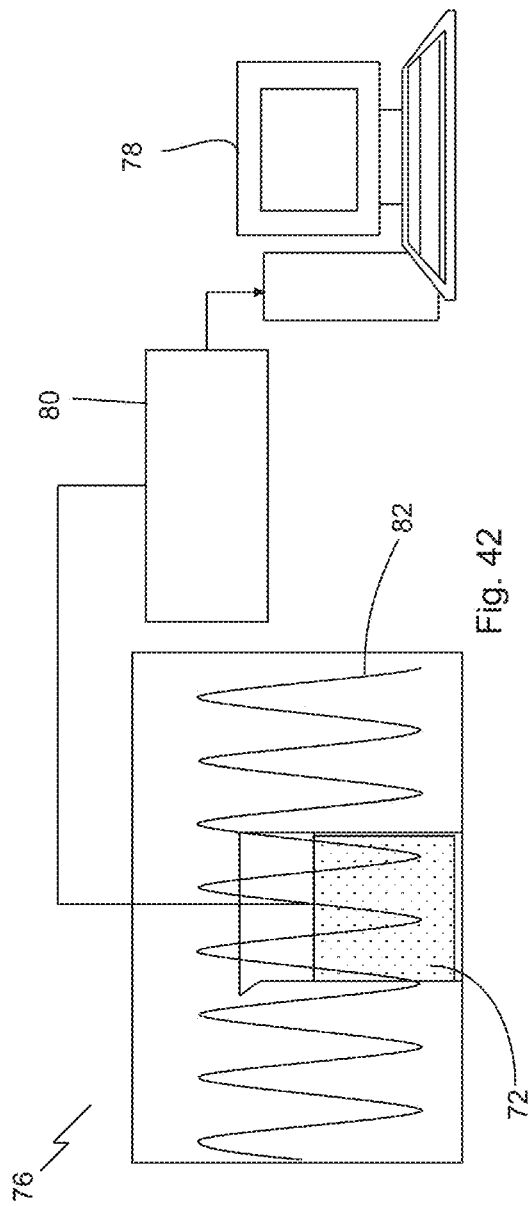
FIG. 42 is a side elevation view of an experimental setup for microwave activation of an adsorbent.
FIG. 43 is a table illustrating properties of various adsorbates.
Figure 44:
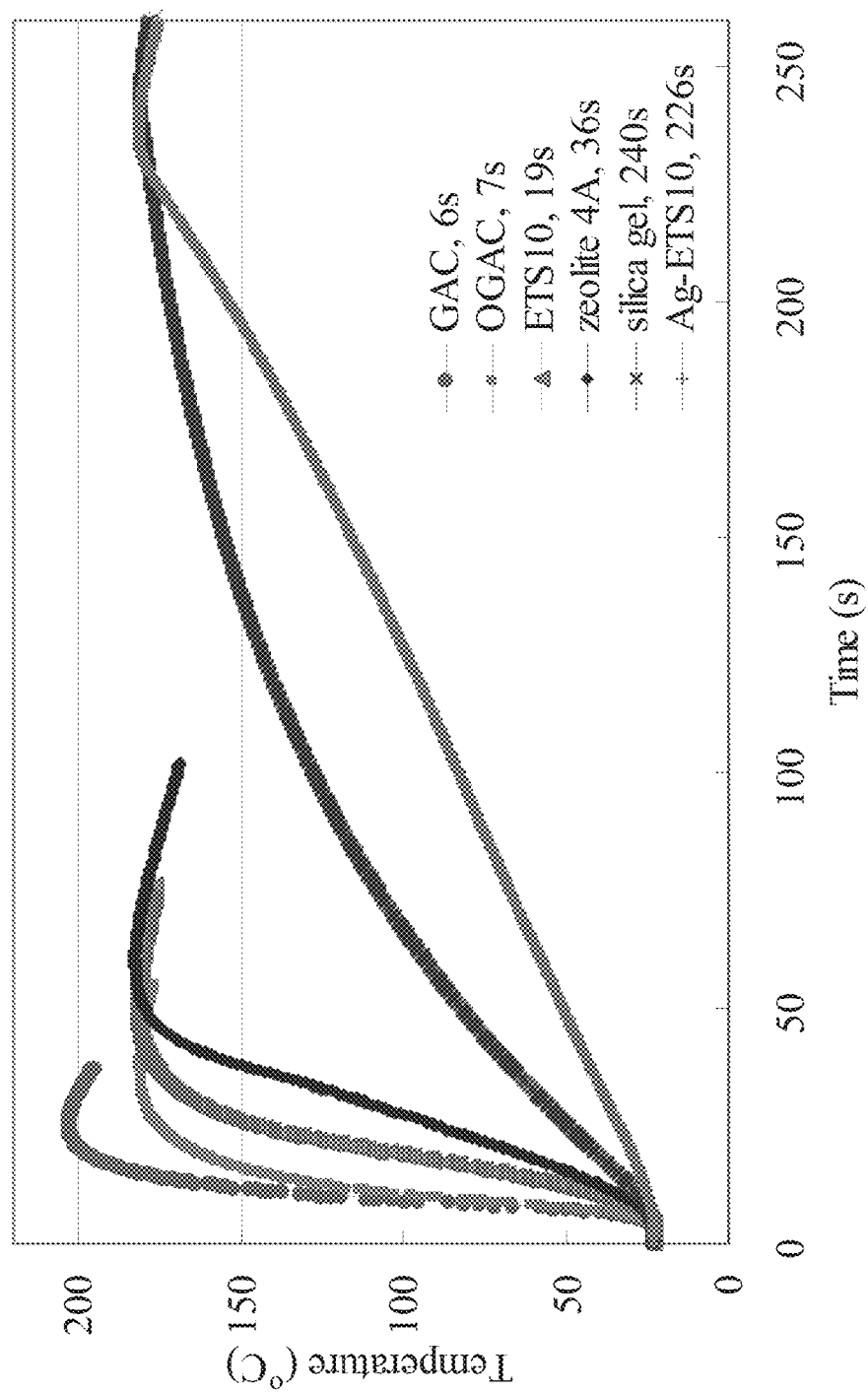
FIGS. 44 and 45 are line graphs that illustrate the temperature increase and heating rate, respectively, as a function of microwave heating time, for several dry adsorbents at high power.
Figure 45:
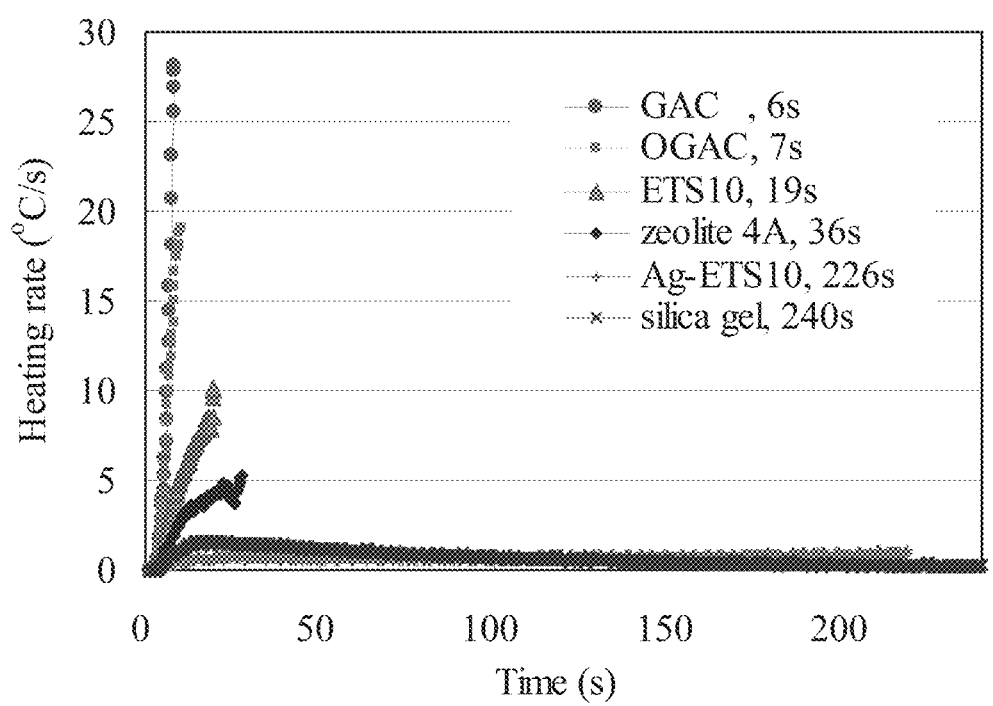

The adsorbent 70 may be one or more of ETS10, Ag-ETS10, zeolite, and silica gel, although other adsorbents 70 may be used. In general, an adsorbent 70 used may be selected to effectively adsorb VOCs. A study was carried out to compare the selective heating of ETS10, Ag-ETS10, zeolite, and silica gel, with GAC and OGAC. Referring to FIG. 42, an experimental apparatus 76 for this study is illustrated. A computer 78 connects to a temperature sensor 80 such as a thermocouple connected to measure temperature in the adsorbate fluid loaded adsorbent 72. Microwaves 82 were sent through the adsorbate fluid loaded adsorbent 72. Loading may comprise saturating, as was done in the study. Referring to FIGS. 44 and 45, dry runs were carried out on dry adsorbent 68 samples, and heating (FIG. 44) and heating rate (FIG. 45) profiles were generated. Samples were dried at 180° C. for 24 hours for these runs. FIG. 45 illustrates that the samples are ordered from highest to lowest heating rate in the order of GAC>OGAC>ETS10>zeolite 4A>silica gel>Ag-ETS10. This graph indicates that GAC and OGAC are good microwave absorbers, with the other materials tested having relatively low microwave absorption ability. OGAC was prepared by oxidization of GAC with acid, while Ag-ETS10 may be formed by silver ion exchange of ETS10.

Figure 46:
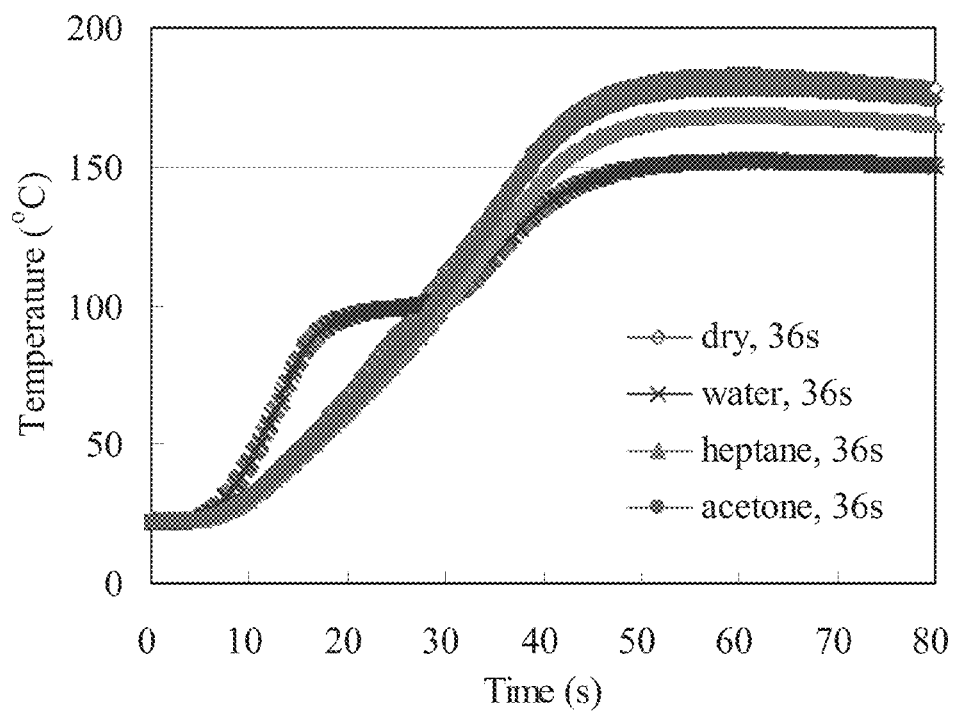
FIG. 46 is a line graph that illustrates the temperature increase as a function of microwave heating time of Zeolite 4A adsorbent saturated with various solvents.
Figure 47:
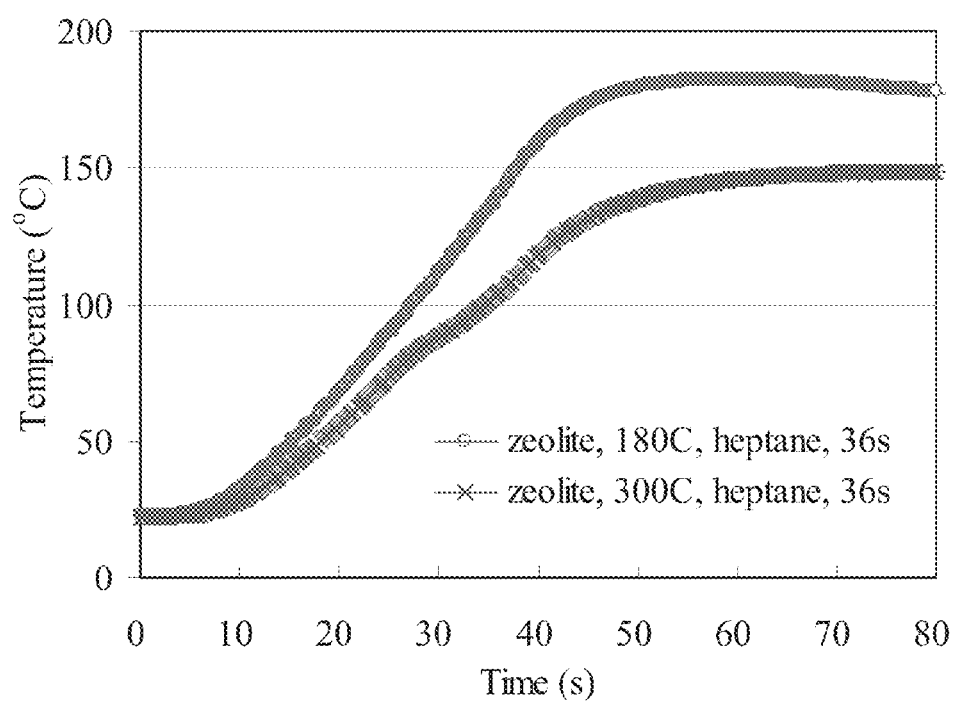
FIG. 47 is a line graph that illustrates the temperature increase as a function of microwave heating time of the same Zeolite 4A sample saturated in heptane after drying at 180° C. for a day and then at 300° C. for a day, respectively.
Figure 50:
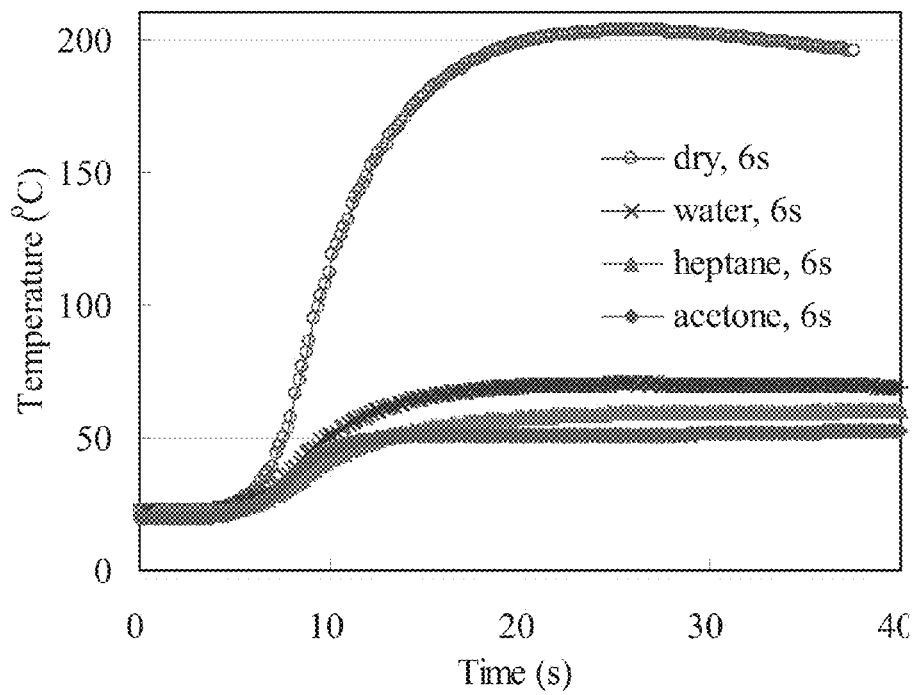
FIGS. 50 and 51 are line graphs that illustrate the temperature increase as a function of microwave heating time of virgin granular activated carbon (GAC) and oxidized granular activated carbon (OGAC), respectively, saturated with various solvents.
Figure 51:
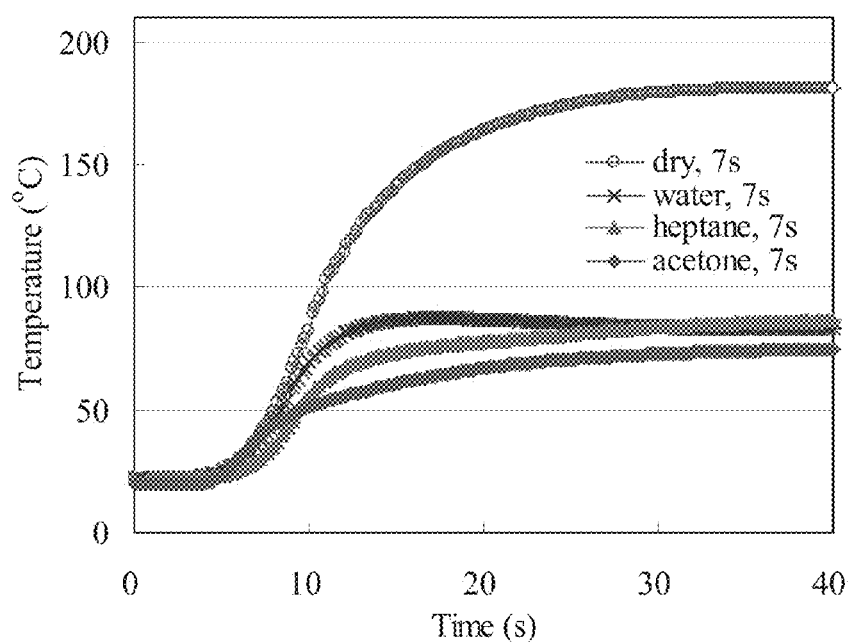

Referring to FIG. 43, in the study carried out various solvents, namely water, n-heptane, and acetone were tested as adsorbates 70. FIG. 43 compares some properties of these adsorbates 70. FIGS. 50 and 51 confirm that GAC and OGAC are excellent microwave absorbers and thus not ideal for selective microwave heating. FIG. 46 illustrates the temperature increase as a function of microwave heating time of Zeolite 4A adsorbent saturated with the various solvents. FIG. 46 illustrates that water saturated zeolite has the highest heating rate due to the high dielectric loss of water. Curiously, n-heptane saturated zeolite had a comparable heating rate to acetone saturated zeolite. Referring to FIG. 47, the relatively high microwave absorption of n-heptane, which is non-polar, when used to saturate zeolite appears to be the result of trace water in the sample, as zeolite dried at 300° C. heated at a lower rate than zeolite dried at 180° C. These results indicate that good results may be obtained when the adsorbate fluid 70 comprises a polar adsorbate fluid such as acetone, water, or acetone and water, although preferably water is used. Regardless, the adsorbate fluid 70 may comprises a non-polar adsorbate fluid 70 such as n-heptane.

Figure 48:
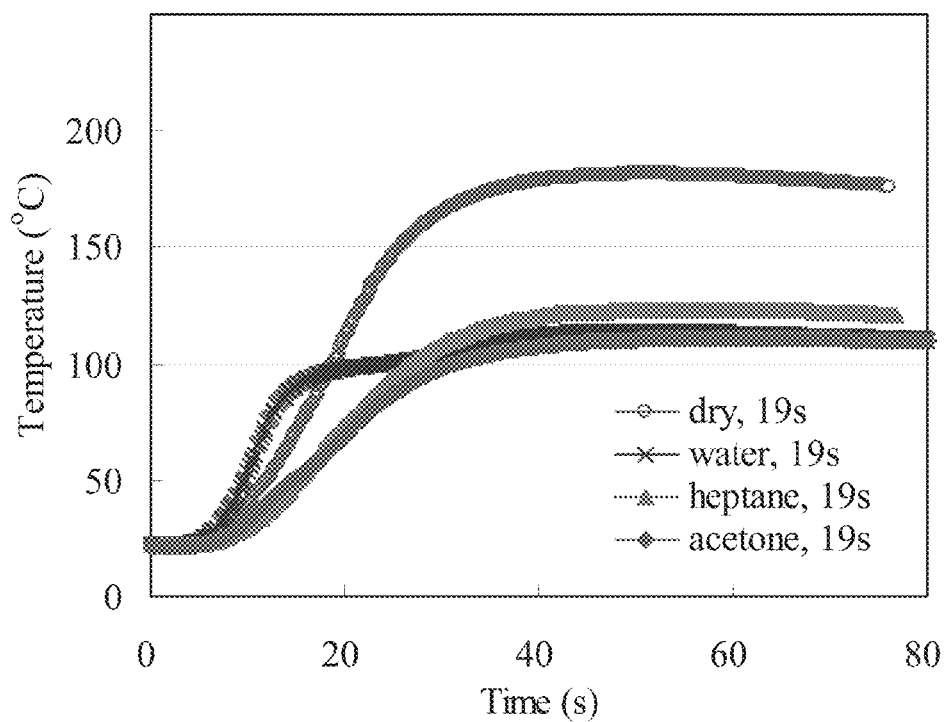
FIGS. 48 and 49 are line graphs that illustrate the temperature increase as a function of microwave heating time of titanosilicate (ETS10) and silver exchanged titanosilicate (Ag-ETS10), respectively, saturated with various solvents.
Figure 49:
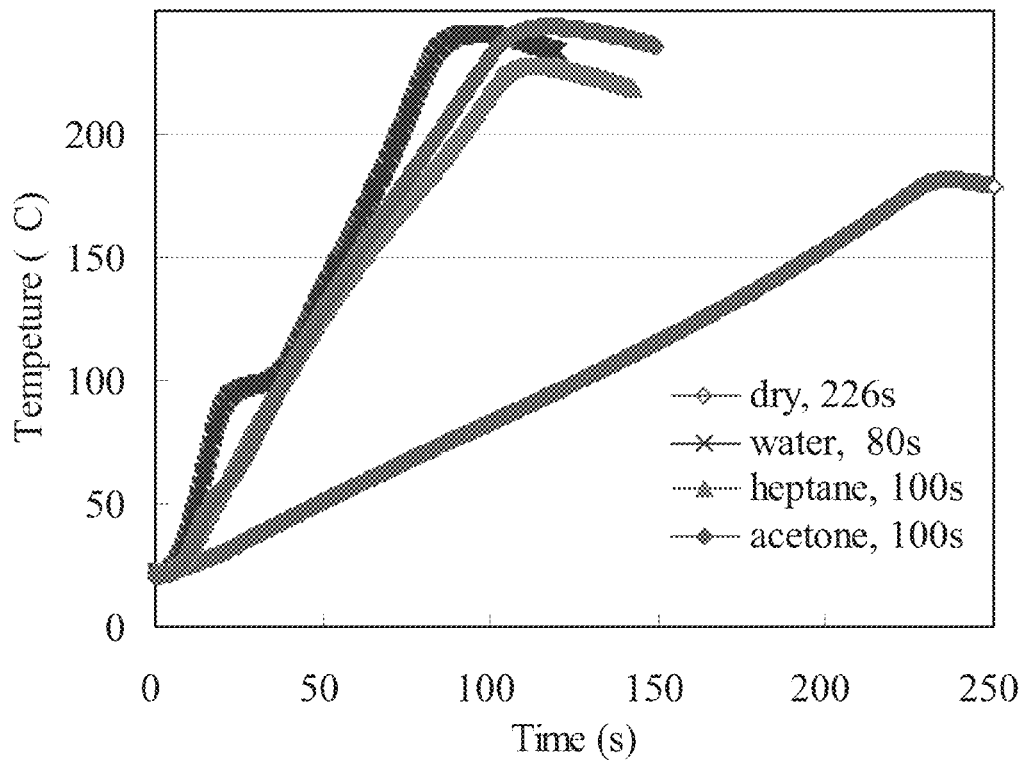
Figure 52:
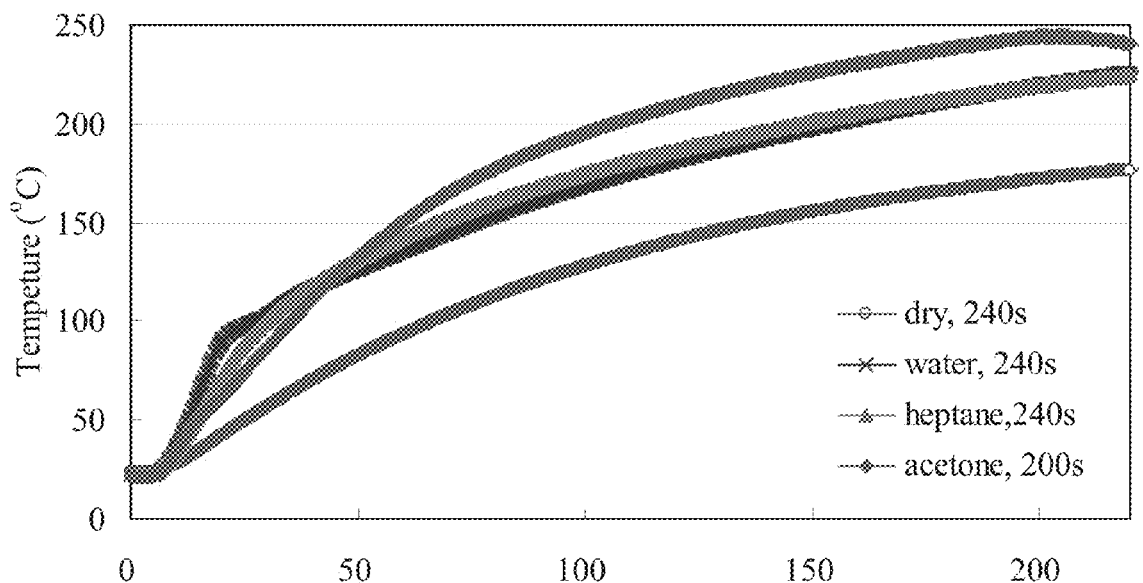
FIG. 52 is a line graph that illustrates the temperature increase as a function of microwave heating time of silica gel saturated with various solvents.

Referring to FIGS. 48 and 49, graphs are provided that illustrate the temperature increase as a function of microwave heating time of titanosilicate (ETS10) and silver exchanged titanosilicate (Ag-ETS10), respectively, saturated with various solvents. Ag-ETS10 allows for more selective heating in comparison to ETS10, with the heating rate of heptane-saturated sample again being improved by trace water. Specifically for Ag-ETS10. FIG. 49 illustrates by the dry run that Ag-ETS10 is effectively microwave transparent. Similarly, referring to FIG. 52 again the dry run illustrates that silica gel is effectively microwave transparent, and is good for selective heating.

The heating rate of saturated adsorbent samples appears to depend on the dielectric loss, heat capacity and heat of vaporization of the adsorbate. The presence of a trace amount of water allows microwave transparent adsorbents saturated with nonpolar adsorbates to be heated by microwaves. Silver in the ETS10 reduces the microwave absorption of the adsorbent, which can improve the selectivity of microwave heating. The thermal behavior of silica gel, Ag-ETS10, and others indicates a potential for lower energy consumption and more energy efficient regeneration of the adsorbents.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method of preparing activated carbon, comprising: exposing carbonaceous material to microwave radiation in the presence of water to produce activated carbon, wherein the carbonaceous material comprises petroleum coke, delayed coke or fluid coke.

2. The method of claim 1 in which the exposing is carried out in the presence of an activation agent in addition to the presence of water.

3. The method of claim 2 in which the activation agent is a chemical activating agent.

4. The method of claim 2 in which the activation agent is a physical activating agent.

5. The method of claim 2 in which the activation agent is any one or more of KOH, K2CO3, KHCO3, NaOH, Na2CO3, NaHCO3, air or carbon dioxide.

6. The method of claim 1 further comprising mixing the carbonaceous material with a chemical activation agent before exposing the carbonaceous material to microwave radiation.

7. The method of claim 6 in which the chemical activation agent comprises one or more of KOH, K2CO3, KHCO3, NaOH, Na2CO3, and NaHCO3.

8. The method of claim 2 further comprising destroying, neutralizing, or removing the activation agent from the activated carbon.

9. The method of claim 1 in which the exposing is carried out in the presence of one or more of carbon dioxide and air.

10. The method of claim 1 in which the water either comprises water vapor, steam, or water droplets, or is contained in wet carbonaceous matter.

11. The method of claim 1 in which the water is water vapor and is carried by a gas carrier.

12. The method of claim 11 in which the gas carrier comprises inert gas.

13. The method of claim 12 in which the gas carrier comprises nitrogen.

14. The method of claim 11 in which the water vapor comprises one or more of steam and water droplets.

15. The method of claim 11 in which the water vapor is flowed through the mixture during exposure of the mixture to microwave radiation or the water is preserved in the coke by impregnating in KOH solution without fully drying.

16. The method of claim 1 in which the water present during the microwave exposure is added to the carbonaceous material beforehand.

17. The method of claim 1 in which the water comprises liquid water.

18. The method of claim 1 in which the carbonaceous material comprises one or more of pyrolyzed or carbonized material.

19. The method of claim 1 in which the carbonaceous material comprises one or more of coal, petroleum coke, tar, char, and a residual of thermal treatment of the oil or coal industry.

20. The method of claim 1 in which the carbonaceous material comprises a byproduct of oil upgrading.

21. The method of claim 6 further comprising pulverizing the carbonaceous material before mixing.

22. The method of claim 1 further comprising drying the activated carbon to remove water.

* * * * *